(12) United States Patent  
Kuroda et al.

(10) Patent No.: US 7,204,598 B2  
(45) Date of Patent: *Apr. 17, 2007

(54) PROJECTOR

(75) Inventors: Akitoshi Kuroda, Yamagata-mura (JP); Akira Momose, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/474,463

(22) Filed: Jun. 26, 2006

(65) Prior Publication Data

US 2006/0244933 A1    Nov. 2, 2006

Related U.S. Application Data

(63) Continuation of application No. 10/898,572, filed on Jul. 26, 2004, now Pat. No. 7,090,360.

(30) Foreign Application Priority Data

Jul. 28, 2003  (JP) .............................. 2003-202201  
Jul. 28, 2003  (JP) .............................. 2003-202208

(51) Int. Cl.  
*G03B 21/14*  (2006.01)

(52) U.S. Cl. .................... 353/101; 353/97; 353/119

(58) Field of Classification Search ................ 353/69, 353/70, 119, 100, 101, 97  
See application file for complete search history.

(56) References Cited

U.S. PATENT DOCUMENTS 2,429,164 A    10/1947  Mast et al.

| | | |
|---|---|---|
| 6,364,491 B1 | 4/2002 | Okada et al. |
| 6,416,184 B1 | 7/2002 | Arai et al. |
| 6,592,228 B1 | 7/2003 | Kawashima et al. |
| 2005/0030492 A1 | 2/2005 | Gishi et al. |
| 2005/0099609 A1 | 5/2005 | Masuzawa et al. |
| 2005/0122483 A1 | 6/2005 | Yamasaki et al. |

FOREIGN PATENT DOCUMENTS

| JP | U-02-076697 | 6/1990 |
|---|---|---|
| JP | A-06-331953 | 12/1994 |

(Continued)

*Primary Examiner*—William C. Dowling  
(74) *Attorney, Agent, or Firm*—Oliff & Berridge, PLC

(57) ABSTRACT

According to exemplary embodiments of the present invention, in a projections lens position adjuster, when a part of a dial exposed from an exterior case is rotated downward, a gear is rotated in an R2 direction. A Y-slider is then moved downward (in a Y3 direction). Accordingly, a Y-table is moved downward, as is a projection lens. When the part of the dial exposed from the exterior case is rotated upward, the projection lens is moved upward. When a part of a dial exposed from the exterior case is rotated leftward. In contrast, when the dial is rotated rightward, the projection lens is moved rightward. Provided around the projection lens are a first light shield for closing a gap between an opening of a front case and a periphery of the projection lens, and a second light shield for closing a gap between the projection lens and a hole of a base of the projection lens position adjuster. A shield body of the first light shield includes a ring-shaped elastic member disposed to extend between a ring and the projection lens, and a pair of attachments extending from the elastic member outward.

11 Claims, 18 Drawing Sheets

FOREIGN PATENT DOCUMENTS

| | | |
|---|---|---|
| JP | A-07-274603 | 10/1995 |
| JP | 08-304739 | 11/1996 |
| JP | 09-230284 | 9/1997 |
| JP | 10-171044 | 6/1998 |
| JP | 2000-250002 | 9/2000 |
| JP | A-2004-245956 | 9/2004 |
| JP | A-2005-018007 | 1/2005 |

PROJECTOR

This is a Continuation of application Ser. No. 10/898,572 filed Jul. 26, 2004 now U.S. Pat. No. 7,090,360. The disclosure of the prior applications is hereby incorporated by reference herein in its entirety.

BACKGROUND OF THE INVENTION

1. Field of Invention

The present invention relates to a projector.

2. Description of Related Art

The related art includes projectors that are used for presentations at conferences, academic societies and exhibitions. Each of such projectors modulates and combines a light beam irradiated by a light source in accordance with image information and projects the light beam on a screen by a projection optical system in an enlarged manner.

In the above projector, there may be an occasion of projecting upward with the projector fixed at a lower level, or that of projecting downward with the projector fixed at a higher level. Related art document JP10-171044A, 3 to 4 pages, FIG. 2, discloses a projector, which is provided with a projection optical system position adjuster at an optical system such as an optical modulator etc. The projection optical system position adjuster moves a projection optical system in a direction orthogonal to a light-irradiating direction. The projection optical system position adjuster rotates a knob (rotary knob) left and right to drive as screwing the knob so as to move the projection optical system up and down.

However, in such a projection optical system position adjuster, since a rotary direction of the knob and a moving direction of the projection optical system are not correspondent, it is difficult to figure out whether the projection optical system is moved up or down, which is a first problem.

Further, in the projector equipped with the projection optical system position adjuster, an elongated opening through which a projection lens is exposed is formed at the projection optical system position adjuster and the casing where the projection lens is housed, so that the projection lens is moved along these elongated openings. In such projector, when the projection optical system is moved, a gap is generated between the projection optical system and the opening formed at the casing, thus the dusts etc. possibly being invaded from the gap. Additionally, the generated gap disfigures the projector. To close the gap, there is provided one or two shield plates which moves along with the projection lens on an inner side of the casing.

However, when the one or two shield plates follows the projection lens, the dimension of the casing along the moving direction of the projection lens must be long enough to secure a range where the shield plates move inside the casing. Accordingly, the length of the casing in the moving direction of the projection lens might be increased, thus increasing the size of the casing, which is a second problem.

Furthermore, when the two shield plates are used, a gap is generated at a part where the two shield plates are layered, and a light may leak from the gap, which is a third problem.

SUMMARY OF THE INVENTION

Exemplary embodiments of the present invention provide a projector having a projection optical system position adjuster that enables a user to easily recognize a moving direction of a projection optical system.

Exemplary embodiments of the present invention provide a projector that can securely reduce or prevent a light beam from leaking, and also reduce or prevent increase of a size of a casing thereof.

A projector according to an exemplary aspect of the present invention that forms an optical image by modulating a light beam irradiated by a light source in accordance with image information and projects the optical image by a projection optical system in an enlarged manner, includes: a projection optical system position adjuster that moves the projection optical system on a plane orthogonal to a light-projecting direction and adjusts a position of a projection area of the projection optical system; and a casing where the projection optical system position adjuster and the projection optical system are housed, in which the projection optical system position adjuster has a first dial and a second dial exposed from the casing when the first dial and the second dial are housed in the casing for adjusting a position of the projection optical system, in which a moving direction of the projection optical system according to a rotation of the first dial is approximately orthogonal to a moving direction of the projection optical system according to a rotation of the second dial, and in which rotary directions of the first dial and the second dial at parts exposed from the casing are approximately correspondent to the directions to which the projection optical system is moved.

With this arrangement, since each rotary direction of the first dial and the second dial at the parts exposed from the casing for adjusting the position of the projection optical system is approximately consistent with the moving direction of the projection optical system, a user can easily recognize the moving direction of the projection optical system. Accordingly, a user may smoothly adjust the position of the projection optical system.

Especially, in such case that the projection optical system is moved toward two directions approximately orthogonal to each other, if the rotary direction of the dial is not consistent with the moving direction of the projection optical system, the user is difficult to recognize the moving direction of the projection optical system, thus likely confusing the user. However, in this configuration, each rotary direction of the first dial and the second dial at the parts exposed from the casing is approximately consistent with the moving direction of the projection optical system, so that the user can easily recognize the moving direction of the projection optical system, thus enhancing or improving a usability.

Preferably, in the above projector, the projection optical system position adjuster has a base fixed on the casing and provided with a hole where the projection optical system is moved, a mount slidably provided on the base with the projection optical system attached thereto, a first transmitter that transmits the rotation of the first dial to the mount to linearly drive the mount, and a second transmitter that transmits the rotation of the second dial to the mount to linearly drive the mount.

With this arrangement, when the first dial and the second dial are rotated, each rotation is transmitted to the mount by the first transmitter and the second transmitter, so that the mount is linearly driven. Since the projection optical system is attached to the mount, the projection lens is also linearly driven, thus adjusting the position of the projection optical system.

Preferably, in the above projector, the first and the second transmitters respectively have a slider fixed on the mount to slide together with the mount, and a gear that rotates along with the rotation of the first dial or the second dial and meshes with the slider.

Since the gear meshes with the slider, the slider is driven as the gear is rotated due to the rotation of the dial. The mount is then moved along with the drive of the slider, accordingly adjusting the position of the projection optical system.

In such configuration, since the rotation of the dial is converted into the linear drive by way of the gear and the slider, the drive structure is simple and the structure of the projection optical system position adjuster would not be complicated.

Preferably, in the above projector, the projection optical system position adjuster includes a recognizer for recognizing a reference position of the projection optical system, and the recognizer changes each rotation torque of the first dial and the second dial.

With this arrangement, since the recognizer for recognizing the reference position of the projection optical system is provided, which changes the rotation torque of the dial, in other words, which changes the force causing the dial to rotate, the user can easily recognize the position of the projection optical system while rotating the dial. Therefore, the usability can be enhanced improved.

Preferably, in the above projector, the projection optical system position adjuster has a base fixed on the casing and provided with a hole where the projection optical system is moved, a mount slidably provided on the base with the projection optical system attached thereto, a first transmitter that transmits a rotation of the first dial to the mount to linearly drive the mount, and a second transmitter that transmits a rotation of the second dial to the mount to linearly drive the mount, the recognizer includes the transmitter having a recess or a protrusion, and a biasing member having a protrusion or a recess and abutting on the transmitter by being biased toward the transmitter, and each rotation torque of the first dial and the second dial is changed when the recess engages with the protrusion.

When the protrusion is formed at the transmitter, the biasing member having the recess is used. On the other hand, when the recess is formed at the transmitter, the biasing member having the protrusion is used.

For example, when the recess is formed at the transmitter whereas the protrusion is formed at the biasing member, the protrusion abuts on the transmitter by being biased toward the transmitter until the projection optical system reaches the reference position. Since the transmitter is driven along with the rotation of the dial, a constant friction is generated between the protrusion and the transmitter, which causes a rotation torque of the dial. When the projection optical system reaches the reference position, the recess engages with the protrusion, the friction is then reduced and the rotation torque of the dial is also reduced. Thus, the reference position of the projection lens can easily be recognized by the user.

The same advantages can be obtained when the protrusion is formed at the transmitter whereas the recess is formed at the biasing member instead.

Since the transmitter is directly connected to the dial, the change of the friction when the recess engages with the protrusion can directly be transmitted to the dial. Accordingly, the change of the rotation torque of the dial can securely be recognized by the user, thus further enhancing or improving the usability.

Further, since the recognizer applies the configuration where the recess engages with the protrusion, the structure of the recognizer would not be complicated.

Preferably, in the above projector, the projection optical system position adjuster has a base fixed on the casing and provided with a hole where the projection optical system is moved and a mount slidably provided on the base with the projection optical system attached thereto, the first dial and the second dial respectively include a dial body exposed from the casing and a shaft provided at the dial and fixed on the base, the recognizer includes the shaft having a recess or a protrusion, and a biasing member having a protrusion or a recess and abutting on the shaft by being biased toward the shaft, and each rotation torque of the first dial and the second dial is changed when the recess engages with the protrusion.

When the recess is formed at the shaft, the biasing member having the protrusion is used, and when the protrusion is formed at the shaft, the biasing member having the recess is used.

With this arrangement, for example, when the recess is formed at the shaft whereas the protrusion is formed at the biasing member, the protrusion abuts on the shaft by being biased toward the shaft until the projection optical system reaches the reference position. According to the rotation of the shaft, the friction is created between it and the protrusion, which causes a rotation torque of the dial. When the projection optical system reaches the reference position, the recess engages with the protrusion, the friction is then reduced and the rotation torque of the dial is also reduced. Thus, the reference position of the projection lens can easily be recognized by the user.

The same advantages can be obtained when the protrusion is formed at the shaft whereas the recess is formed at the biasing member instead.

With this arrangement, since the recess or the protrusion is formed on the dial itself, the user can further securely recognize the change of the friction when the recess engages with the protrusion as the change of the rotation torque.

Further, since the recognizer applies the configuration where the recess engages with the protrusion, the structure of the recognizer would not be complicated.

Preferably, in the above projector, the reference position of the projection optical system is approximately at the mid position in the moving direction of the projection optical system.

The reference position is approximately the mid position (center position) in the moving direction of the projection optical system, so that the user can easily recognize the center position. For instance, the center position is effective when the optical axis of the projection optical system is approximately consistent with the center of the image projected on the screen.

A projector according to another exemplary aspect of the present invention includes: a light source; an optical modulator that forms an optical image by modulating a light beam irradiated by the light source in accordance with image information; a device body having a projection optical system that projects the optical image formed by the optical modulator in an enlarged manner; and a casing where the device body is housed, in which the projection optical system is provided with a projection optical system position adjuster that adjusts a position of a projection area, in which the casing has an opening through which the projection optical system is exposed and moved by the projection optical system position adjuster, in which a light shield for closing a gap between the projection optical system and the opening is disposed inside the casing, and in which the light shield includes a ring held at a periphery of the projection optical system in a loosely fitted manner, and an elastic member disposed to extend between the ring and a peripheral edge of the opening of the casing.

With this arrangement, since the light shield has the elastic member disposed to extend between the ring attached to the projection optical system and the peripheral edge of the opening of the casing, the gap between the projection optical system and the opening can be closed. Since the elastic member is attached to the ring held by the projection optical system, when the position of the projection optical system is adjusted, the elastic member is stretched and compressed to follow the movement of the projection optical system. Accordingly, even when the position of the projection optical system is adjusted, the gap between the projection optical system and the opening can securely be closed, thus preventing the light leakage.

Further, since the gap between the projection optical system and the opening can securely be closed, the invasion of the dusts from the gap can also be reduced or prevented.

Further, in the light shield according to the above exemplary aspect of the present invention, since the elastic member is stretched and compressed to follow the movement of the projection optical system, but the shield plate does not follow it unlike the conventional manner, the dimension of the casing along the moving direction of the projection optical system is not required to be elongated in order to secure the range where the light shield moves inside the casing, thus reducing or preventing the casing from growing in the size.

Since the ring is held at the periphery of the projection optical system in a loosely fitted manner, the ring would not be rotated even when the projection optical system is rotated during the focus adjustment etc. Since the elastic member is fixed on such ring, the elastic member can be reduced or prevented from twisting etc. caused by an external force applied to the elastic member along with the rotation of the projection optical system.

Preferably, in the above projector, the projection optical system position adjuster has a base having a hole through which the projection optical system is inserted and moved, and a second light shield including an elastic member disposed to extend between the periphery of the projection optical system and a peripheral edge of a hole of the base.

With this arrangement, since the projector includes the second light shield which has the elastic member disposed to extend between the periphery of the projection optical system and the peripheral edge of the hole of the base of the projection optical system position adjuster, the light leakage from the gap between the projection optical system position adjuster and the projection optical system can be reduced or prevented.

Since the second light shield has the elastic member as is the above-described light shield, the elastic member is stretched and compressed when the position of the projection optical system is adjusted to follow the movement of the projection optical system. Accordingly, when the position of the projection optical system is adjusted, the gap between the projection optical system position adjuster and the projection optical system can securely be closed.

Further, since the gap between the projection optical system and the projection optical system position adjuster can securely be closed, the invasion of the dusts from the gap can also be reduced or prevented.

Since there are provided the two light shields of the above-described light shield and the second light shield, the light leakage and the invasion of the dusts can securely be reduced or prevented.

Preferably, in the above projector, the elastic member includes a deformable part disposed between the ring and the peripheral edge of the opening of the casing, or between the periphery of the projection optical system and the peripheral edge of the hole of the base, and attachments provided on both ends of the deformable part to be attached to the ring and the peripheral edge of the opening of the casing, or to be attached to the periphery of the projection optical system and the peripheral edge of the hole of the base, and the deformable part is formed thinner than the attachment.

With this arrangement, the deformable part that deforms along with the position adjustment of the projection optical system is formed thinner, the deformable part can flexibly be deformed along with the position adjustment of the projection optical system. Accordingly, the position adjustment of the projection optical system would not be difficult because of providing the light shield, but the position thereof can smoothly be adjusted with the light shield applied.

Further, the attachment is formed thicker than the deformable part so as to be fixed at the ring and the peripheral edge of the opening of the casing, or at the periphery of the projection lens and the peripheral edge of the hole of the base tightly.

Preferably, in the above projector, the light shield includes a fixing plate for fixing the elastic member at the peripheral edge of the opening of the casing, and the elastic member is sandwiched between the fixing plate and the peripheral edge of the opening of the casing.

With this arrangement, since the elastic member of the light shield is sandwiched by the fixing plate and the casing, the elastic member can securely be attached to the peripheral edge of the opening of the casing.

Preferably, the above projector further includes: a projection optical system position adjuster that moves the projection optical system on a plane orthogonal to a light-projecting direction and adjusts a position of a projection area, in which the projection optical system position adjuster has a dial exposed from the casing when the dial is housed in the casing, in which a position of the projection optical system is adjusted according to a rotation of the dial, and in which a rotary direction of the dial at the part exposed from the casing is approximately consistent with a direction to which the projection optical system is moved.

With this arrangement, since the rotary direction of the dial at the part exposed from the casing for adjusting the position of the projection optical system is approximately consistent with the moving direction of the projection optical system, the user can easily recognize the moving direction of the projection optical system. Accordingly, the user may smoothly adjust the position of the projection optical system.

Preferably, in the above projector, in which the projection optical system position adjuster has a base fixed on the casing and provided with a hole where the projection optical system is moved, a mount slidably provided on the base with the projection optical system attached thereto, and a transmitter that transmits a rotation of the dial to the mount to linearly drive the mount.

With this arrangement, when the dial is rotated, the rotation is transmitted to the mount by the transmitter, and the mount is then linearly driven. Since the projection optical system is attached to the mount, the projection lens is also linearly driven, thus adjusting the position of the projection optical system.

Preferably, in the above projector, the transmitter has a slider fixed on the mount to slide together with the mount, and a gear that rotates along with the rotation of the dial and meshes with the slider.

Since the gear meshes with the slider, the slider is driven as the gear is rotated due to the rotation of the dial. The mount is then moved along with the drive of the slider, accordingly adjusting the position of the projection optical system.

In such configuration, since the rotation of the dial is converted into the linear drive by way of the gear and the slider, the drive structure is simple and the structure of the projection optical system position adjuster would not be complicated.

Preferably, in the above projector, the projection optical system position adjuster includes a recognizer for recognizing a reference position of the projection optical system, and the recognizer changes a rotation torque of the dial.

With this arrangement, since the recognizer for recognizing the reference position of the projection optical system is provided, which changes the rotation torque of the dial, in other words, which changes the force causing the dial to rotate, the user can easily recognize the position of the projection optical system while rotating the dial. Therefore, the usability can be enhanced or improved.

Preferably, in the above projector, the projection optical system position adjuster has a base fixed on the casing and provided with a hole where the projection optical system is moved, a mount slidably provided on the base with the projection optical system attached thereto, and a transmitter that transmits a rotation of the dial to the mount to linearly drive the mount, the recognizer has the transmitter having a recess or a protrusion, and a biasing member having a protrusion or a recess and abutting on the transmitter by being biased toward the transmitter, and the rotation torque of the dial is changed when the recess engages with the protrusion.

When the protrusion is formed at the transmitter, the biasing member having the recess is used. On the other hand, when the recess is formed at the transmitter, the biasing member having the protrusion is used.

For example, when the recess is formed at the transmitter whereas the protrusion is formed at the biasing member, the protrusion abuts on the transmitter by being biased toward the transmitter until the projection optical system reaches the reference position. Since the transmitter is driven along with the rotation of the dial, a constant friction is generated between the protrusion and the transmitter, which causes a rotation torque of the dial. When the projection optical system reaches the reference position, the recess engages with the protrusion, the friction is then reduced and the rotation torque of the dial is also reduced. Thus, the reference position of the projection lens can easily be recognized by the user.

The same advantages can be obtained when the protrusion is formed at the transmitter whereas the recess is formed at the biasing member instead.

Since the transmitter is directly connected to the dial, the change of the friction when the recess engages with the protrusion can directly be transmitted to the dial. Accordingly, the change of the rotation torque of the dial can securely be recognized by the user, thus further enhancing or improving the usability.

Further, since the recognizer applies the configuration where the recess engages with the protrusion, the structure of the recognizer would not be complicated.

Preferably, in the above projector, the projection optical system position adjuster has a base fixed on the casing and provided with a hole where the projection optical system is moved and a mount slidably provided on the base with the projection optical system attached thereto, the dial includes a dial body exposed from the casing and a shaft provided at the dial and fixed on the base, the recognizer has the shaft having a recess or a protrusion, and a biasing member having a protrusion or a recess and abutting on the shaft by being biased toward the shaft, and the rotation torque of the dial is changed when the recess engages with the protrusion.

When the recess is formed at the shaft, the biasing member having the protrusion is used, and when the protrusion is formed at the shaft, the biasing member having the recess is used.

With this arrangement, for example, when the recess is formed at the shaft whereas the protrusion is formed at the biasing member, the protrusion abuts on the shaft by being biased toward the shaft until the projection optical system reaches the reference position. According to the rotation of the shaft, the friction is created between it and the protrusion, which causes a rotation torque of the dial. When the projection optical system reaches the reference position, the recess engages with the protrusion, the friction is then reduced and the rotation torque of the dial is also reduced. Thus, the reference position of the projection lens can easily be recognized by the user.

The same advantages can be obtained when the protrusion is formed at the shaft whereas the recess is formed at the biasing member instead.

With this arrangement, since the recess or the protrusion is formed on the dial itself, the user can further securely recognize the change of the friction when the recess engages with the protrusion as the change of the rotation torque.

Further, since the recognizer applies the configuration where the recess engages with the protrusion, the structure of the recognizer would not be complicated.

Preferably, in the above projector, the reference position of the projection optical system is approximately at the mid position in the moving direction of the projection optical system.

The reference position is approximately the mid position (center position) in the moving direction of the projection optical system, so that the user can easily recognize the center position. For instance, the center position is effective when the optical axis of the projection optical system is approximately consistent with the center of the image projected on the screen.

DETAILED DESCRIPTION OF PREFERRED EMBODIMENTS

Exemplary embodiments of the present invention will be described below with reference to the attached drawings.

First Exemplary Embodiment (1) Exterior Arrangement

Figure 1:
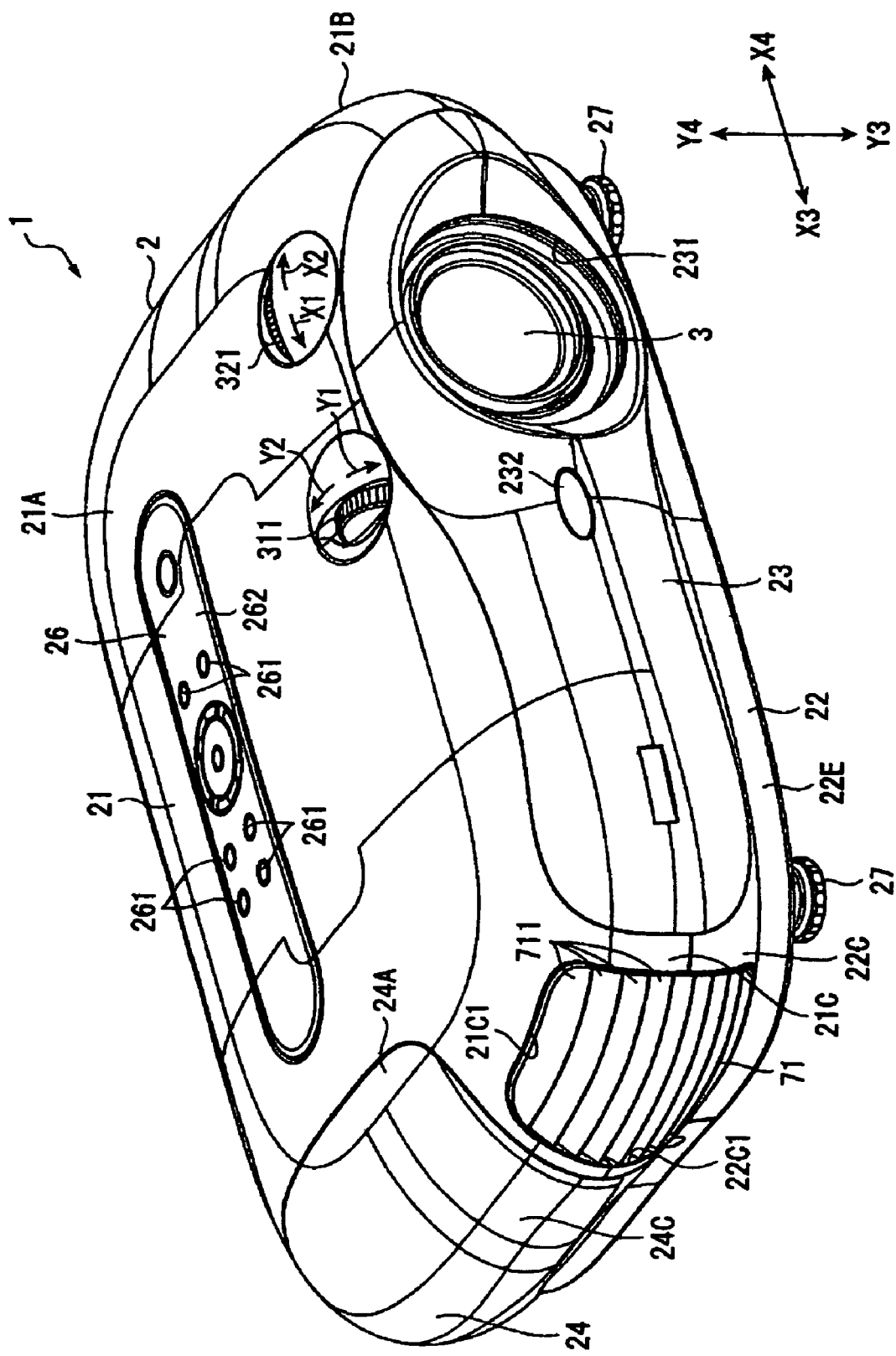
FIG. 1 is a schematic perspective view showing an upper front side of a projector according to a first exemplary embodiment of the present invention.
Figure 2:
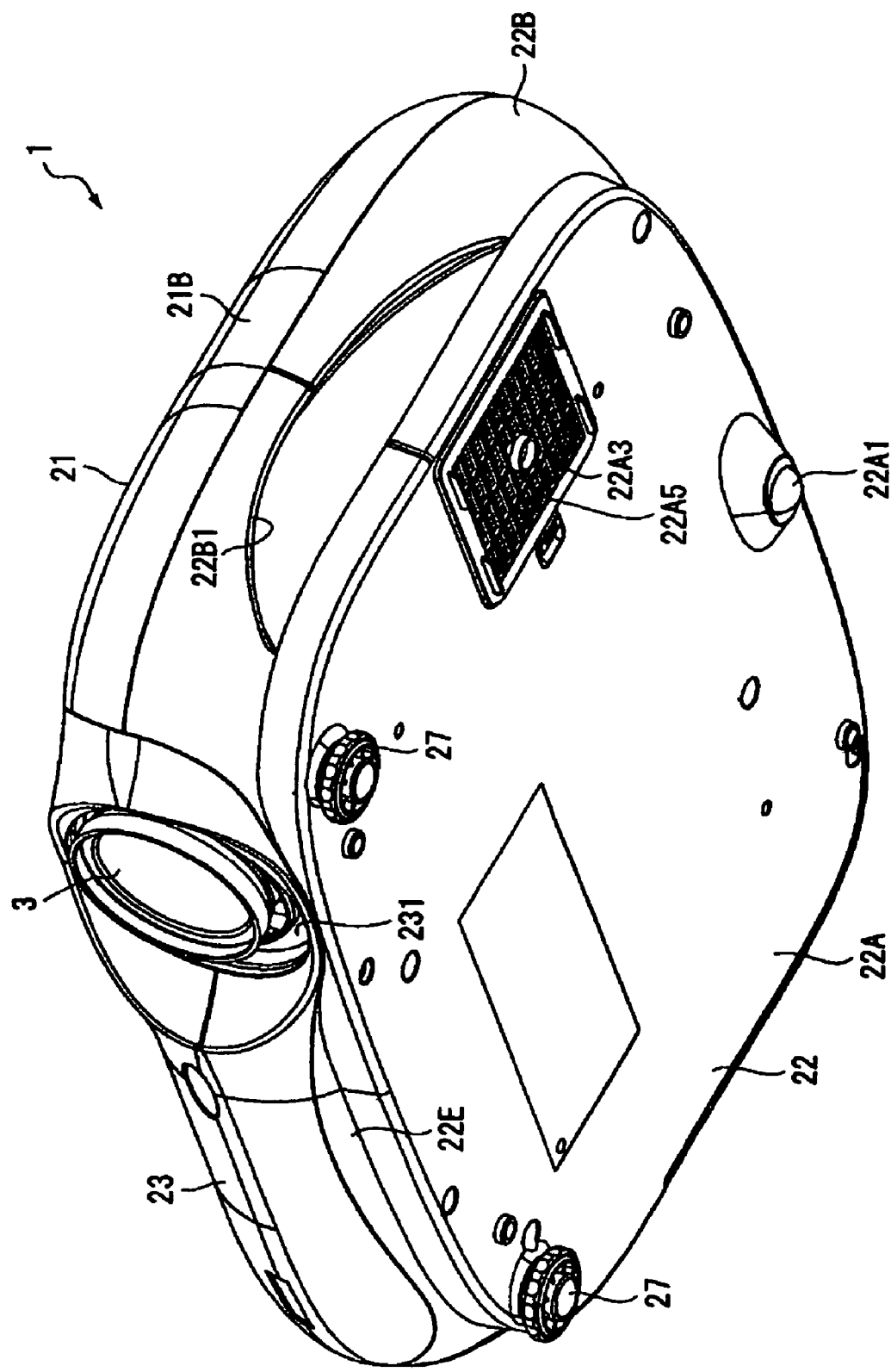
FIG. 2 is a schematic perspective view showing a lower front side of the projector of the aforesaid exemplary embodiment.
Figure 3:
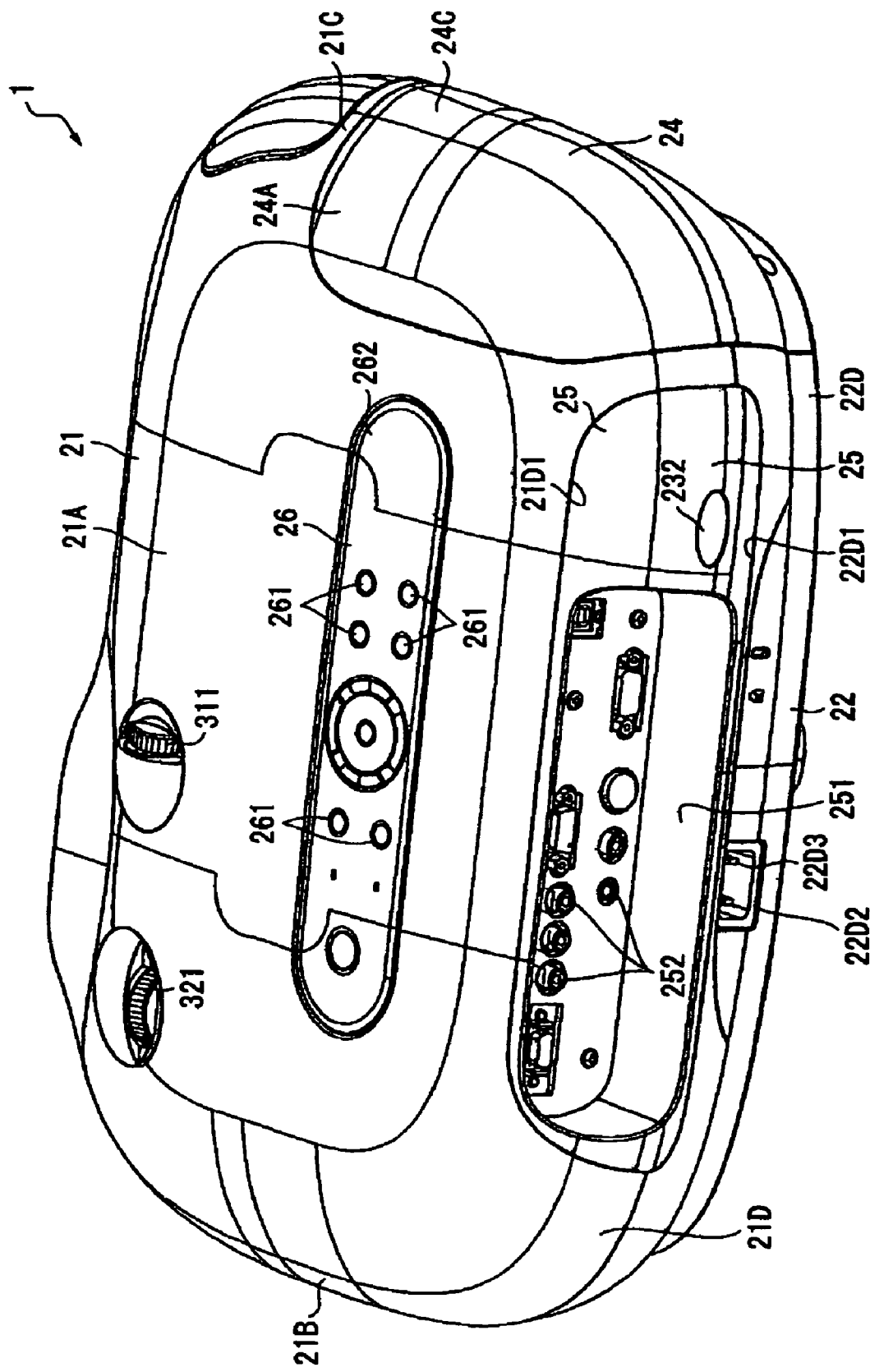
FIG. 3 is a schematic perspective view showing an upper rear side of the projector of the aforesaid exemplary embodiment.
Figure 4:
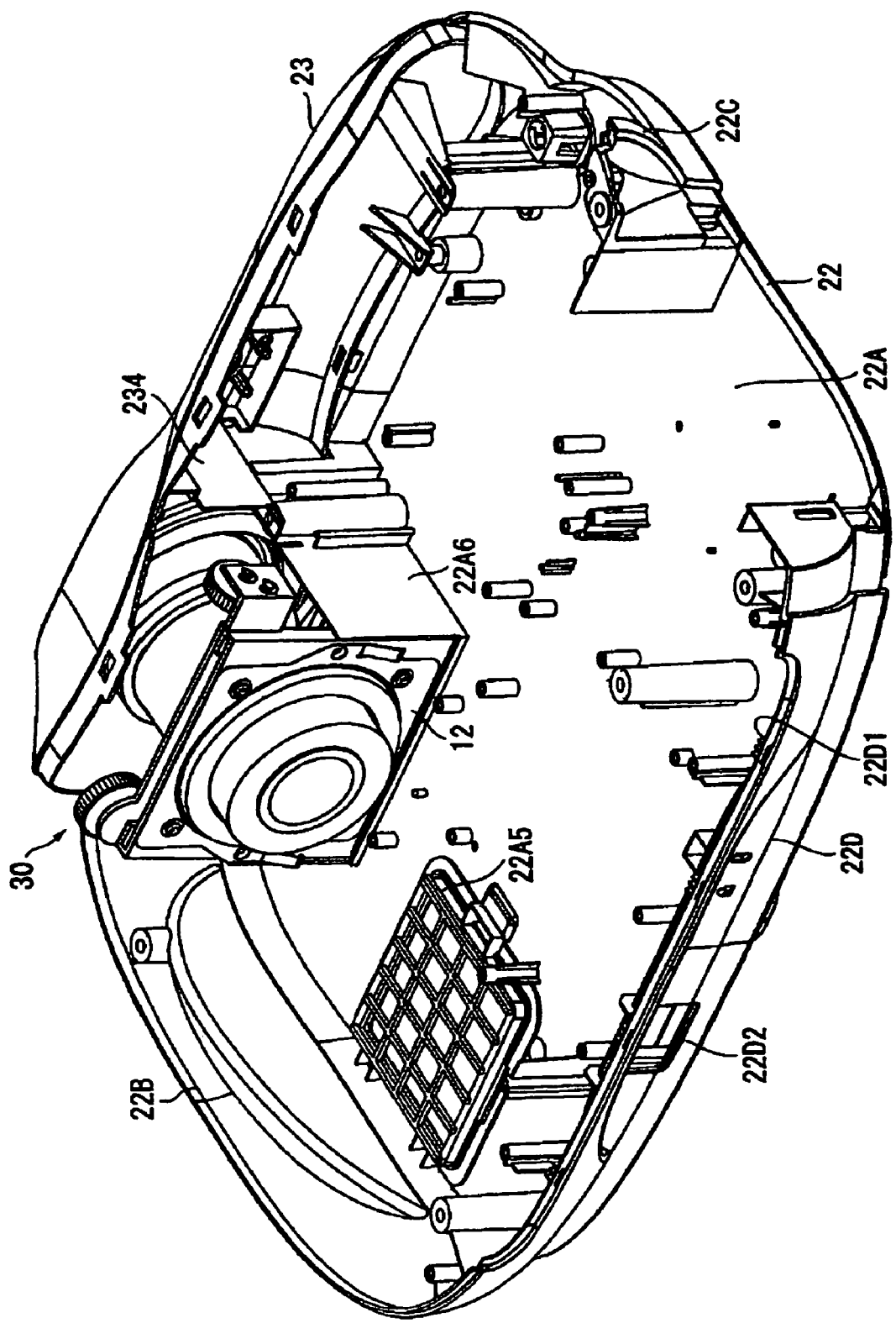
FIG. 4 is a schematic perspective view showing an upper side of a lower case and a front case of the projector of the aforesaid exemplary embodiment.

FIG. 1 is a schematic perspective view showing an upper front side of a projector 1 according to the present exemplary embodiment. FIG. 2 is a schematic perspective view showing a lower front side of the projector 1. FIG. 3 is a schematic perspective view showing an upper rear side of the projector 1. FIG. 4 is a schematic perspective view showing a part of an exterior case 2 of the projector 1.

The projector 1 modulates a light beam irradiated by a light source in accordance with image information and projects the light beam on a projection surface such as a screen in an enlarged manner. As shown in FIGS. 1 to 3, the projector 1 has an approximately rectangular parallelepiped exterior case 2 and a projection lens 3 exposed from the exterior case 2.

The projection lens 3 serves as a projection optical system that projects in an enlarged manner an optical image modulated by a liquid crystal panel, which is a below-described optical modulator. The projection lens 3 is configured as a lens set including a plurality of lenses housed in a lens barrel.

The exterior case 2 is an approximately planarly-viewed rectangular casing made of synthetic resin, which houses a device body including an optical unit (described below) of the projector 1. The exterior case 2 has an upper case 21 covering an upper section of the device body, a lower case 22 covering a lower section of the device body, a front case 23 covering a front section of the device body, a side case 24 covering a part of a lateral section of the device body and a rear case 25 (FIG. 3) covering a rear section of the device body.

Note that, each corner of an upper side, a front side, a lateral side, a bottom side and a rear side of the exterior case 2 is curved.

The upper case 21 has an approximately planarly-viewed rectangular upper side 21A covering the upper section of the device body, a lateral side 21B extending substantially vertically downward from a longitudinal edge of the upper side 21A, a lateral side 21C extending substantially vertically downward from the other longitudinal edge of the upper side 21A, and a rear side 21D (see FIG. 3) extending substantially vertically downward from a rear edge of the upper side 21A.

As shown in FIG. 1 or 3, an operation panel 26 for actuating and adjusting the projector 1 is provided approximately at the rear center of the upper side 21A as extending horizontally. Pushing an operation button 261 of the operation panel 26 causes contact with a tactile switch installed on a circuit board (not shown) disposed inside the operation panel 26 to allow a desired operation. Additionally, an LED (not shown here) is mounted on the circuit board so that the LED emits a light in response to the desired operation.

A decorative board 262 is provided on the operation panel 26 so that the operation button 261 is surrounded by the decorative board 262. The light emitted by the LED is diffused via the decorative board 262.

Two dials 311 and 321 (a first dial 311 and a second dial 321) of a projection lens position adjuster 30 (see FIG. 4) to vertically and horizontally move the projection lens 3 to adjust the position of the projection lens 3 are exposed from the front side of the upper side 21A (right side in FIG. 1). When the dial 311 disposed at the left side in FIG. 1 out of the two dials 311 and 321 is moved in a Y1 direction (downward), the projection lens 3 is moved in a Y3 direction (downward). In contrast, when the dial 311 is moved in a Y2 direction (upward), the projection lens 3 is moved in a Y4 direction (upward).

When the dial 321 disposed at the right side in FIG. 1 is moved in an X1 direction (rightward as seen from the rear side of the projector 1), the projection lens 3 is moved in an X3 direction (rightward). In contrast, when the dial 321 is moved in an X2 direction (leftward as seen from the rear side of the projector 1), the projection lens 3 is moved in an X4 direction (leftward). Namely, the moving directions of the projection lens 3 by way of the dials 311 and 321 are substantially orthogonal to each other.

Though not shown, a rib is vertically arranged on an inner side of the upper side 21A to surround a periphery of the projection lens 3.

A cutting portion 21C1 is formed at the lateral side 21C, through which a louver 71 having a plurality of vanes 711 is exposed.

Referring to FIG. 3, a cutting portion 21D1 that engages with the rear case 25 is formed on the rear side 21D.

As shown in FIGS. 1 to 4, the lower case 22 has a bottom side 22A, lateral sides 22B and 22C, a rear side 22D and a front side 22E.

As shown in FIG. 2, the bottom side 22A is an approximately planarly-viewed rectangle with a fixed leg 221A1 provided on the bottom side 22A approximately at the center of the rear side of the projector 1 and an adjustment leg 27 provided thereon at both ends in a longitudinal direction of the front side.

The adjustment leg 27 has a shaft member 271 (see FIG. 5) advanceably/retractably projecting from the bottom side 22A in an out-plane direction, so that the vertical and horizontal inclination of the projector 1 can be adjusted while the projector 1 projecting an image.

Further, an opening 22A3 communicating with the inside of the exterior case 2 is formed at the bottom side 22A.

The opening 22A3 is an intake for drawing in cooling air from the outside of the exterior case 2. A cover 22A5 with a plurality of openings formed is attached to the opening 22A3.

As shown in FIG. 4, a rib 22A6 is vertically arranged on the bottom side 22A to surround the periphery of the projection lens 3.

The lateral side 22B is vertically arranged on a longitudinal edge of the bottom side 22A to compose the lateral side of the exterior case 2 by engaging with the lateral side 21B of the upper case 21 as shown in FIG. 2.

As shown in FIG. 2, a recess 22B1 is dented toward the upper case 21 to serve as a suspender for suspending the projector 1.

As shown in FIG. 1, the lateral side 22C is vertically arranged at the other longitudinal edge of the front side of the bottom side 22A to compose a part of the lateral side of the exterior case 2 by engaging with the lateral side 21C of the upper case 21. A cutting portion 22C1 is formed at the lateral side 22C by largely cutting out an upper edge thereof, so that the louver 71 is exposed through the cutting portion 22C1. That is, an opening with the louver 71 exposed through is formed by the cutting portion 21C1 of the lateral side 21C and the cutting portion 22C1 of the lateral side 22C. Air having cooled the inside of the projector 1 is discharged from the opening.

As shown in FIG. 3, the rear side 22D is vertically arranged on an edge of a shorter side of the bottom side 22A. A cutting portion 22D1 that engages with the rear case 25 is formed on the rear side 22D. Namely, in the present exemplary embodiment, the rear sides 21D, 22D and the rear case 25 compose the rear side of the exterior case 2.

A rectangular opening 22D2 is formed at the rear side 22D, and an inlet connector 22D3 is exposed through the opening 22D2. The inlet connector 22D3 is a terminal to supply the electric power supplied from the outside power source to the projector 1, the inlet connector 22D3 being connected to a below-described power source unit electrically.

Referring to FIG. 1 again, the front side 22E is vertically arranged on the other edge of the sorter side of the bottom side 22A. The front side 22E engages with the front case 23 to compose the front side of the exterior case 2.

As shown in FIGS. 1 and 2, the approximately ellipsoidal front case 23 has an opening 231 through which the projection lens 3 is exposed on the side of the longitudinal edge (right side in FIG. 1). Though not shown, a first light shield for closing a gap between the opening 231 and the periphery of the projection lens 3, and a second light shield 12 (see FIG. 4) for closing a gap between the projection lens 3 and the projection lens position adjuster 30 are attached to the projection lens 3 exposed through the opening 231.

A remote controller sensor window 232 is formed approximately at the center of the front case 23. A remote controller module (not shown) for receiving an operation signal from a remote controller (not shown) is disposed inside the remote controller sensor window 232.

An activation switch and an adjustment switch etc. similar to the one provided on the operation panel 26 are provided on the remote controller. When the remote controller is operated, an infrared signal corresponding to the operation is output from the remote controller to be received by a receiver via the remote controller sensor window 232, so that the infrared signal is processed by the below-described control board.

As shown in FIG. 4, a rib 234 is vertically arranged at the inner side of the front case 23 to surround the periphery of the projection lens 3. The rib 234, the rib 22A6 of the bottom side 22A of the lower case 22, and the rib of the upper side 21A of the upper case 21 compose a lens house to surround the projection lens 3.

As shown in FIGS. 1 and 3, the side case 24 has an upper side 24A and a lateral side 24C extending substantially vertically downward from the upper side 24A. The upper side 24A composes the upper side of the exterior case 2 by engaging with the upper side 21A of the upper case 21.

The lateral side 24C engages with the lateral side 21C of the upper case 21 and the lateral side 22C of the lower case 22.

As shown in FIG. 3, the rear case 25 is fixed by fitting into an opening formed by the cutting portion 21D1 of the rear side 21D of the upper case 21 and the cutting portion 22D1 of the rear side 22D of the lower case 22.

The rear case 25 is a planarly-viewed rectangle. A remote controller sensor window 232 similar to the one of the front case 23 is formed around the longitudinal edge of the rear case 25.

A dent 251 dented toward the inside of the exterior case 2 is formed on the rear case 25, and a plurality of connector terminals 252 are exposed from the dent 251.

The connector terminals 252 input an image signal and a sound signal etc. output from external electric equipments, and are connected to an interface board located inside the rear case 25.

Incidentally, the interface board is electrically connected to the below-described control board and the signal processed by the interface board is output to the control board.

(2) Internal Arrangement

Figure 5:
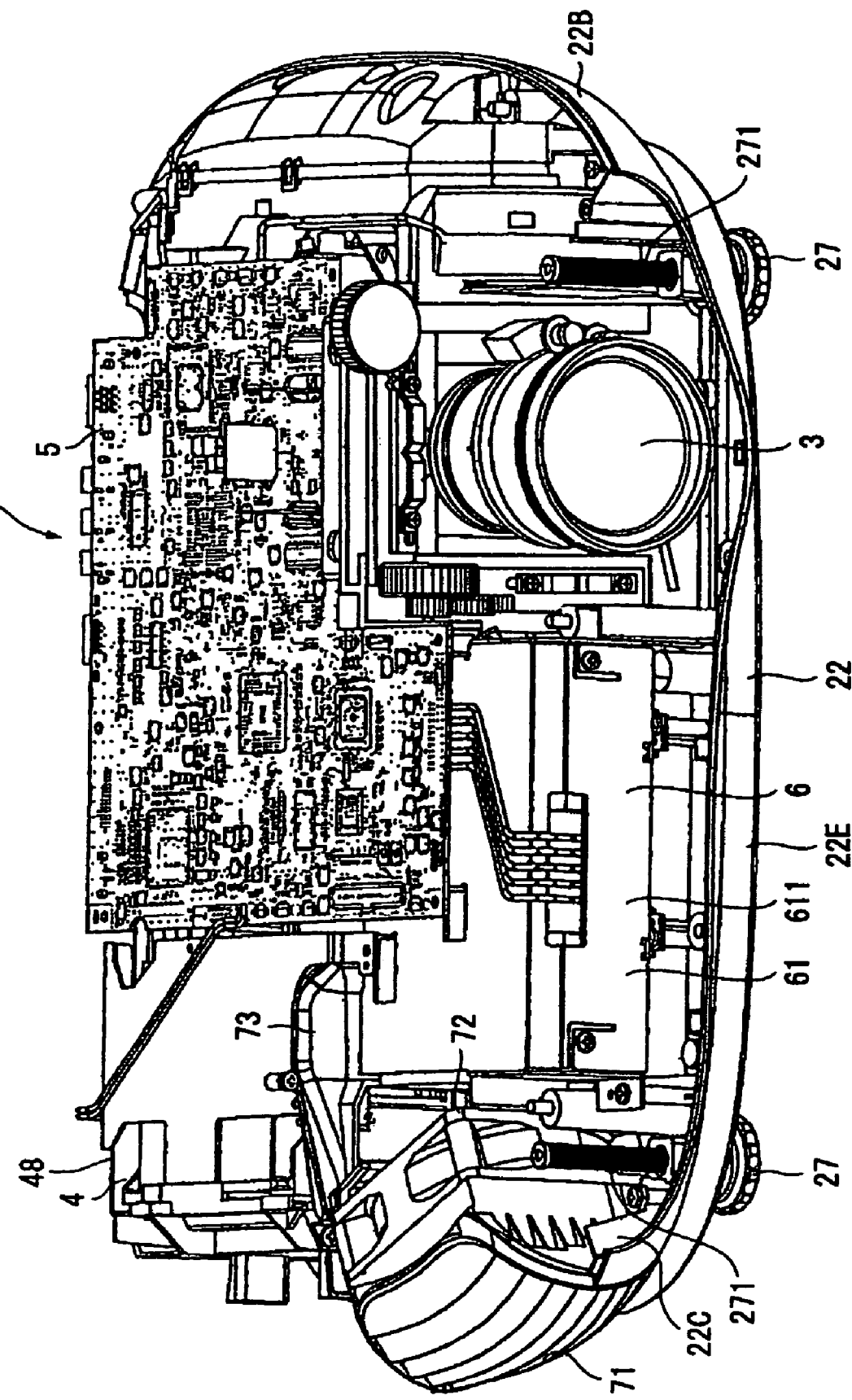
FIG. 5 is a schematic perspective view showing an interior structure of the projector of the aforesaid exemplary embodiment.

FIG. 5 is a schematic showing the internal arrangement of the projector 1. More specifically, FIG. 5 only shows the lower case 22 of the exterior case 2, with the upper case 21, the front case 23, the side case 24 and the rear case 25 removed.

The device body 8 of the projector 1 is housed inside the exterior case 2, the device body 8 including the optical unit 4 horizontally extending along the longitudinal direction of the exterior case 2, the control board 5 disposed at an upper part of the optical unit 4, and the power source unit 6.

(2-1) Structure of Optical Unit 4

Figure 6:
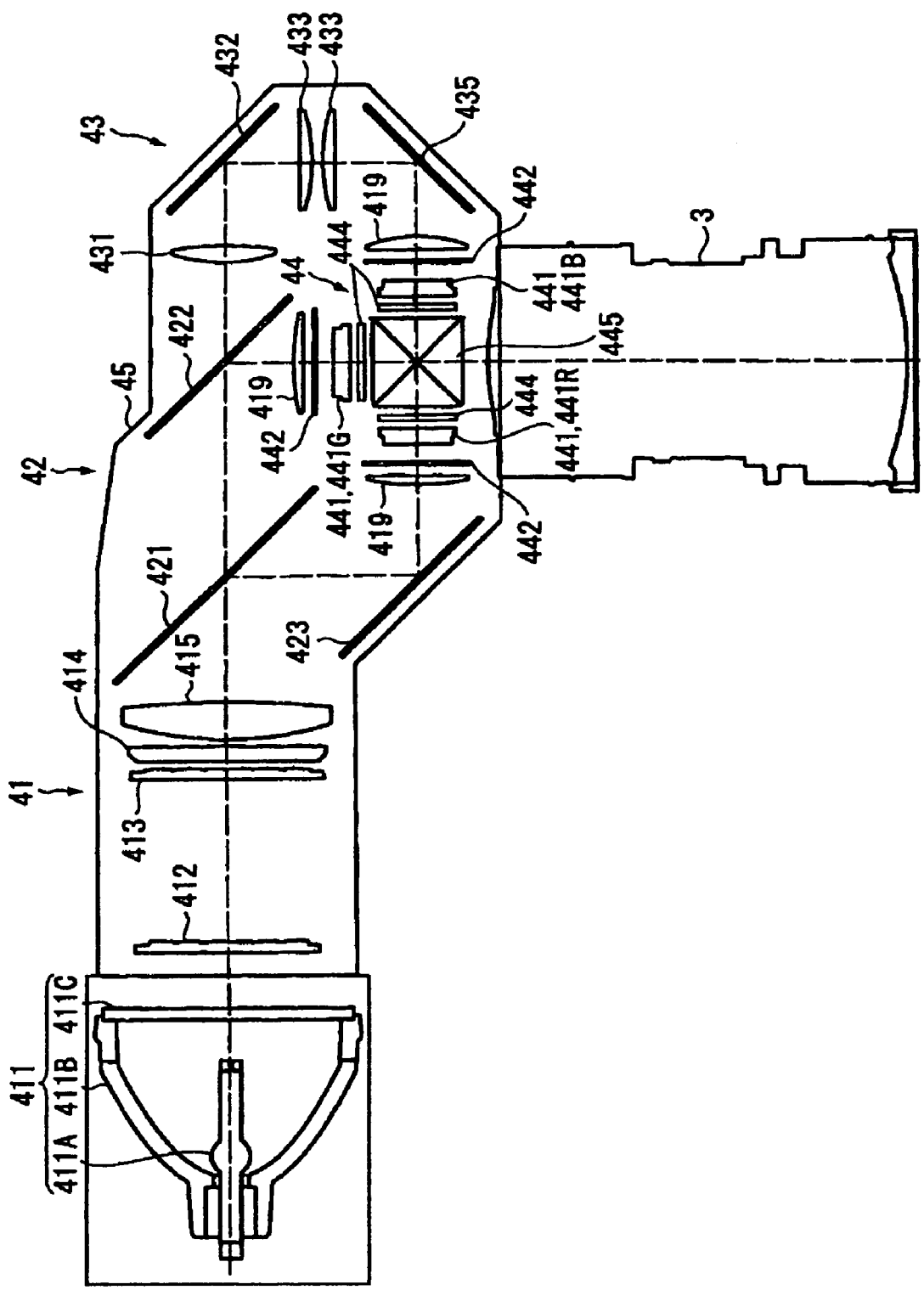
FIG. 6 is a schematic illustration showing an optical system of an optical unit of the aforesaid exemplary embodiment.

The optical unit 4 modulates a light beam irradiated by a light source in accordance with image information to form an optical image, and forms a projected image on a screen through the projection lens 3. As shown in FIG. 6, the optical unit 4 includes functionally independent components of an integrator illuminating optical system 41, a color-separating optical system 42, a relay optical system 43, an optical device 44 integrating an optical modulator and a color-combining optical device, and an approximately rectangular parallelepiped inner case 45 (see FIG. 7) in which the optical components 41, 42, 43 and 44 are housed and arranged.

The integrator illumination optical system 41 is an optical system for equalizing the illuminance of the light beam irradiated by the light source on a plane orthogonal to the illumination optical axis. The integrator illuminating optical system 41 has a light source device 411, a first lens array 412, a second lens array 413, a polarization converter 414 and a superposing lens 415.

The light source device 411 has a light source lamp 411A (a radial light source), a reflector 4111B, and an anti-explosion glass 411C covering a light-irradiation side of the reflector 411B. The radial light beam irradiated by the light source lamp 411A is reflected by the reflector 411B to be an approximately parallel light beam and is irradiated toward the outside. In the present exemplary embodiment, a high-pressure mercury lamp is used as the light source lamp 411A and a parabolic mirror is used as the reflector 411B. Incidentally, the light source lamp 411A may not be a high-pressure mercury lamp but may be a metal halide lamp or a halogen lamp. Further, though a parabolic mirror is used as the reflector 411B, a parallelizing concave lens disposed on the irradiation-side of a reflector of an ellipsoidal mirror may alternatively be used.

The first lens array 412 has small lenses arranged in a matrix, the lenses having substantially rectangular profile seen in the illumination optical axis direction. The respective lenses separates the light beam irradiated by the light source lamp 411A into sub-beams and emits the sub-beams in the illumination optical axis direction.

The second lens array 413 is arranged approximately in the same manner as the first lens array 412, which includes small lenses arranged in a matrix. The second lens array 413 together with the superposing lens 415 superposes the image of the respective small lenses of the first lens array 412 onto the below-described liquid crystal panels 441R, 441G and 441B of the optical device 44.

The polarization converter 414 converts the light from the second lens array 413 into substantially uniform polarized light, thereby enhancing the light utilization efficiency of the optical device 44.

Specifically, the respective sub-beams converted into substantially uniform polarized light by the polarization converter 414 is substantially superposed on the below-described liquid crystal panels 441R, 441G and 441B of the optical device 44 by the superposing lens 415. Since only one-type of polarized light can be used in a projector using the liquid crystal panels 441R, 441G and 441B that modulates a polarized light, approximately half of the light beam from the light source lamp 411A emitting random polarized light cannot be used. Accordingly, with the use of the polarization converter 414, the light beam irradiated by the light source lamp 411A is converted into substantially uniform polarized light to enhance the light utilization efficiency of the optical device 44. Incidentally, such polarization converter 414 is disclosed in, for instance, related art document JP08-304739A.

The color-separating optical system 42 has two dichroic mirrors 421 and 422, and a reflection mirror 423. The plurality of sub-beams irradiated by the integrator illuminating optical system 41 are separated into three color lights of red (R), green (G) and blue (B) by the two dichroic mirrors 421 and 422.

The relay optical system 43 has an incident-side lens 431, a pair of relay lenses 433, and reflection mirrors 432 and 435. The relay optical system 43 guides the color light (blue light) separated by the color-separating optical system 42 toward the below-described liquid crystal panel 441B of the optical device 44.

At this time, the dichroic mirror 421 of the color-separating optical system 42 transmits the green light component and blue light component of the light beam irradiated by the integrator illuminating optical system 41 and reflects the red light component. The red light reflected by the dichroic mirror 421 is reflected by the reflection mirror 423, which reaches the liquid crystal panel 441R for red color through a field lens 419. The field lens 419 converts the respective sub-beams irradiated by the second lens array 413 into a light beam parallel to the central axis (main beam) thereof.

The field lenses 419 provided on the light-incident side of the other liquid crystal panels 441G and 441B function in the same manner.

In the blue and green lights transmitted through the dichroic mirror 421, the green light is reflected by the dichroic mirror 422, which reaches the liquid crystal panel 441G for green light through the field lens 419. On the other hand, the blue light passes through the dichroic mirror 422, which passes through the relay optical system 43 to reach the liquid crystal panel 441B for blue light through the field lens 419.

Note that, the relay optical system 43 is used for the blue light in order to avoid deterioration in the light utilization efficiency on account of light dispersion and the like caused by the longer length of the optical path of the blue light than the optical path of the other color light. In other words, the relay optical system 43 is used for directly transmitting the sub-beams incident on the incident-side lens 431 to the field lens 419. Incidentally, though the blue light of the three color lights passes through the relay optical system 43, the red light, for instance, may alternatively pass through the relay optical system 43.

The optical device 44 modulates the incident light beam in accordance with image information to form a color image. The optical device 44 has three incident-side polarization plates 442 on which the respective color lights separated by the color-separating optical system 42 are incident, the liquid crystal panels 441 (441R, 441G and 441B) as optical modulators and irradiate-side polarization plates 444 disposed on the downstream of the respective incident-side polarization plates 442, and a cross dichroic prism 445 as a color-combining optical device.

The liquid crystal panels 441R, 441G and 441B use, for instance, a polycrystalline silicon TFT as a switching element, which has a pair of opposing transparent substrates with liquid crystal sealed therebetween. The liquid crystal panels 441R, 441G and 441B irradiate the light beam incident thereon through the incident-side polarization plates 442 after modulating in accordance with image information.

The incident-side polarization plate 442 only transmits a polarized light in a predetermined direction out of the respective color lights separated by the color-separating optical system 42 and absorbs the other light beam, which has a substrate made of sapphire glass or the like with a polarization film attached thereon.

The irradiation-side polarization plate 444 is also arranged substantially in the same manner as the incident-side polarization plate 442, which only transmits the polarized light in a predetermined direction out of the light beam irradiated by the liquid crystal panels 441R, 441G and 441B, where the polarization axis of the transmitted polarized light is set orthogonal to the polarization axis of the polarized light transmitted through the incident-side polarization plate 442.

The cross dichroic prism 445 combines the optical image irradiated by the irradiation-side polarization plate 444 and modulated for each color light to form a color image. In the cross dichroic prism 445, a dielectric multi-layer film for reflecting the red light and a dielectric multi-layer film for reflecting the blue light are formed along the boundaries of four right-angle prisms approximately in an X-shape, the dielectric multi-layer films combining the three color lights.

The above-described liquid crystal panels 441R, 441G and 441B, the irradiation-side polarization plates 444 and the cross dichroic prism 445 are integrated as a unit.

Figure 7:
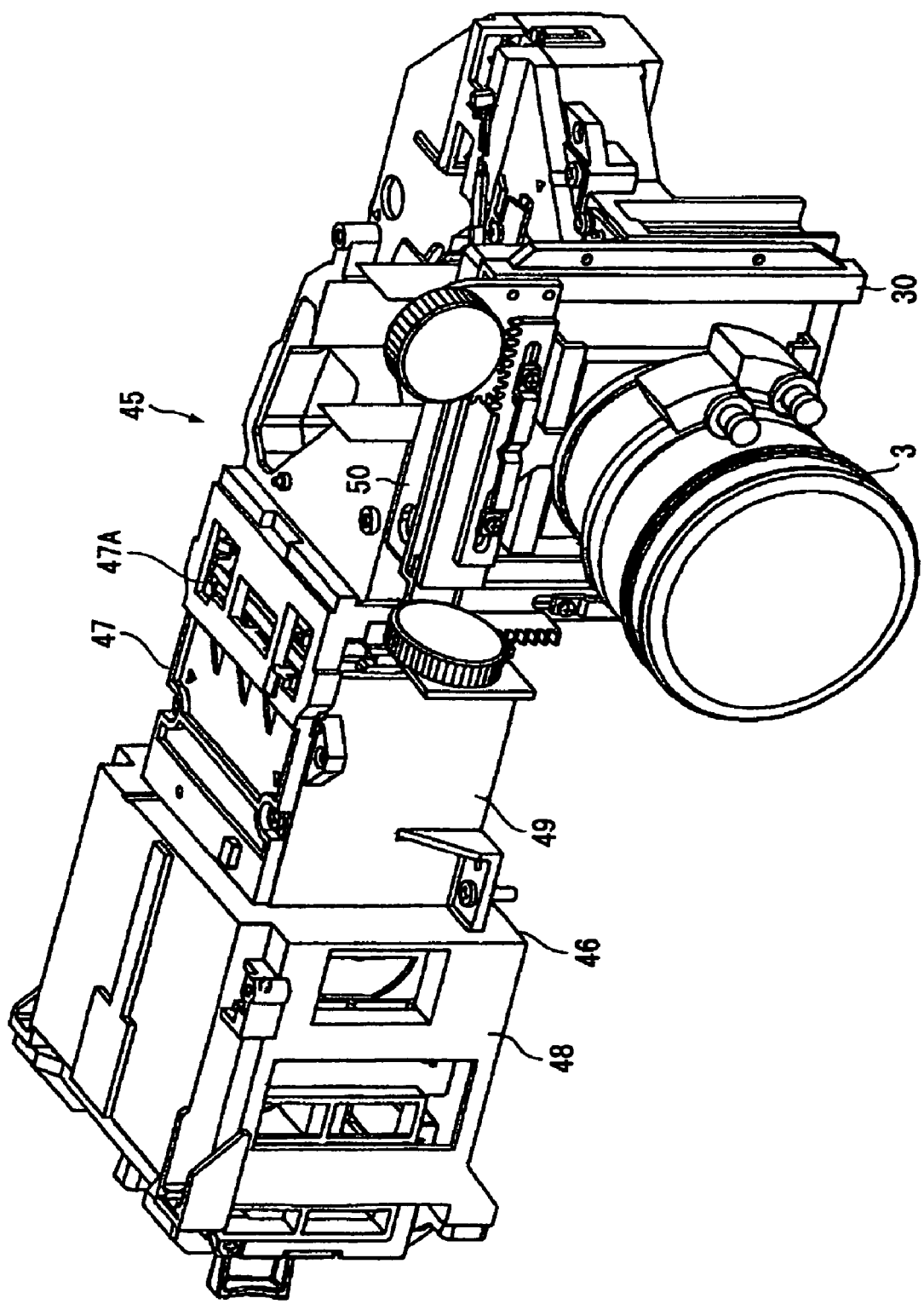
FIG. 7 is a schematic perspective view showing a light guide of the aforesaid exemplary embodiment.

FIG. 7 is an illustration showing the structure of the inner case 45.

The inner case 45 is a synthetic resin component formed by injection molding and the like, which includes a lower inner case 46 where the above-described optical components 41, 42, 43 and 44 are housed, and a lid-shaped upper inner case 47 for closing the upper opening of the lower inner case 46.

The lower inner case 46 has a light source housing 48 where the light source device 411 is housed, and a component housing 49 formed in a container where other optical components are housed except the light source device 411.

The light source housing 48 has an approximately box-shape, and openings are respectively formed on a distal side near the component housing 49 and on a side opposite thereto. The opening formed on the side near the component housing 49 transmits a light beam irradiated by the light source device 411. The opening formed on the side opposite to the side near the component housing 49 serves as an opening through which the light source device 411 is housed by inserting from the lateral side of the light source housing 48.

The component housing 49 is an approximately rectangular parallelepiped with an upper side thereof being opened, an end thereof being connected to the light source housing 48. A head 50 on which the projection lens 3 is fixed by screws is attached to the other end of the component housing 49. The head 50 places the projection lens 3 at a predetermined position on the illumination optical axis set inside the inner case 45.

Though not specifically shown here, a plurality of grooves for slidably fitting the optical components 412 to 415, 419, 421 to 423 and 431 to 435 are formed at the component housing 49. The optical device 44 is placed at a part of the component housing 49 adjacent to the head 50.

The upper inner case 47 closes an upper opening of the component housing 49 of the lower inner case 46, but does not close above the optical device 44. A plurality of openings 47A are formed at the upper inner case 47 by penetrating through it, so that the air having cooled the inside of the inner case 45 is discharged from the openings 47A.

(2-2) Structure of Control Board 5

As shown in FIG. 5, the control board 5 is disposed above the upper inner case 47 of the inner case 45. The control board 5 is a circuit board having a processor such as a CPU (Central Processing Unit) installed thereon, which controls the operation of the entire projector 1. The control board 5 controllably drives the liquid crystal panels 441R, 441G and 441B based on the signal outputted by the above-described interface board. The liquid crystal panels 441R, 441G and 441B modulate the light beam to form an optical image. Further, an operation signal outputted by the circuit board of the above-described operation panel 26 and the non-illustrated remote controller module is inputted to the control board 5 and the control board 5 outputs a control command to the components of the projector 1 based on the operation signal.

(2-3) Structure of Power Supply Unit 6

The power supply unit 6 for supplying the electric power to the light source device 411 and the control board 5 etc., is disposed along the longitudinal direction of the front case 23 of the exterior case 2. The power source unit 6 has a power source block 61 containing a power source circuit, a lamp drive block (not shown) disposed below the power source block 61.

The power source block 61 supplies the electric power supplied from the outside through the power cable connected to the inlet connector 22D3 to the lamp drive block and the control board 5 etc. The power source block 61 has a circuit board having a transformer for converting the inputted alternate-current into a low-voltage direct-current and a converter for converting the output of the transformer into a predetermined voltage on one side thereof, and a tube component 611 (shield component) covering the circuit board. The tube component 611 is made of aluminum and is formed in an approximately box-shape with both ends being opened.

The lamp drive block is a converter for supplying the electric power to the above-described light source device 411 at a constant voltage. The alternate-current electricity input from the power source block 61 is commutated and converted into the direct-current electricity or the alternate-current electricity in rectangular wave by the lamp drive block to be supplied to the light source device 411.

An exhaust fan 72 is provided at the lateral side of the power source unit 6 to discharge the air having cooled the power source unit 6 through the opening where the louver 71 is attached. Further, a duct 73 is provided between the power source unit 6 and the light source housing 48 of the inner case 45, so that the air having cooled the light source device 411 inside the light source housing 48 is attracted by the exhaust fan 72 to be discharged from the opening through the duct 73.

(3) Projection Lens Position Adjuster 30

Figure 8:
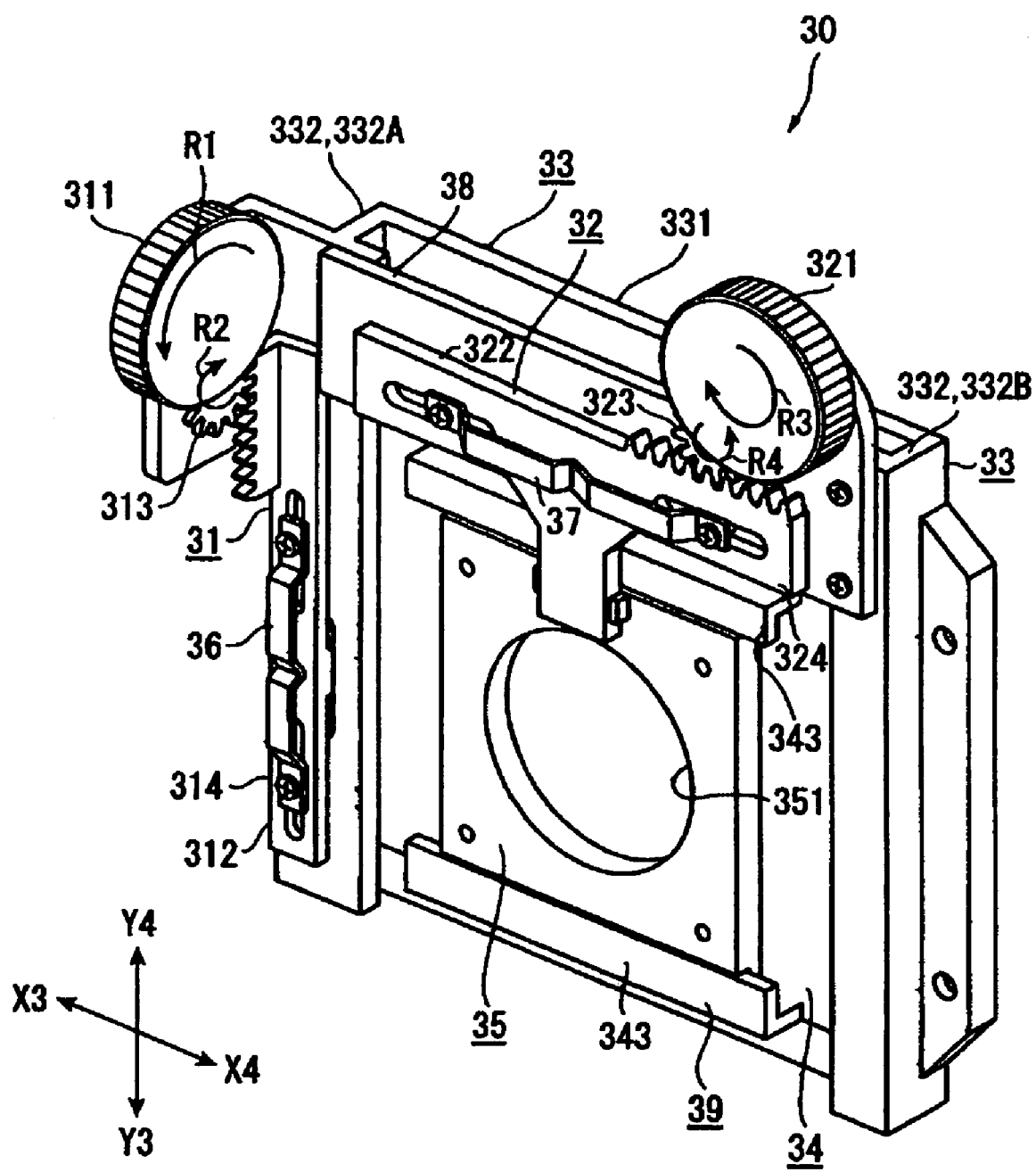
FIG. 8 is a schematic perspective view showing a projection lens position adjuster of the aforesaid exemplary embodiment.

FIG. 8 shows the projection lens position adjuster 30. The projection lens position adjuster 30 moves the projection lens 3 vertically (in the Y3 and Y4 directions) and horizontally (in the X3 and X4 directions) to adjust the position of the projection area.

For adjusting the position of the projection lens 3, assume that an axis associating the Y3 and Y4 directions represents a Y-axis, and an axis associating the X3 and X4 directions represents an X-axis.

Figure 9:
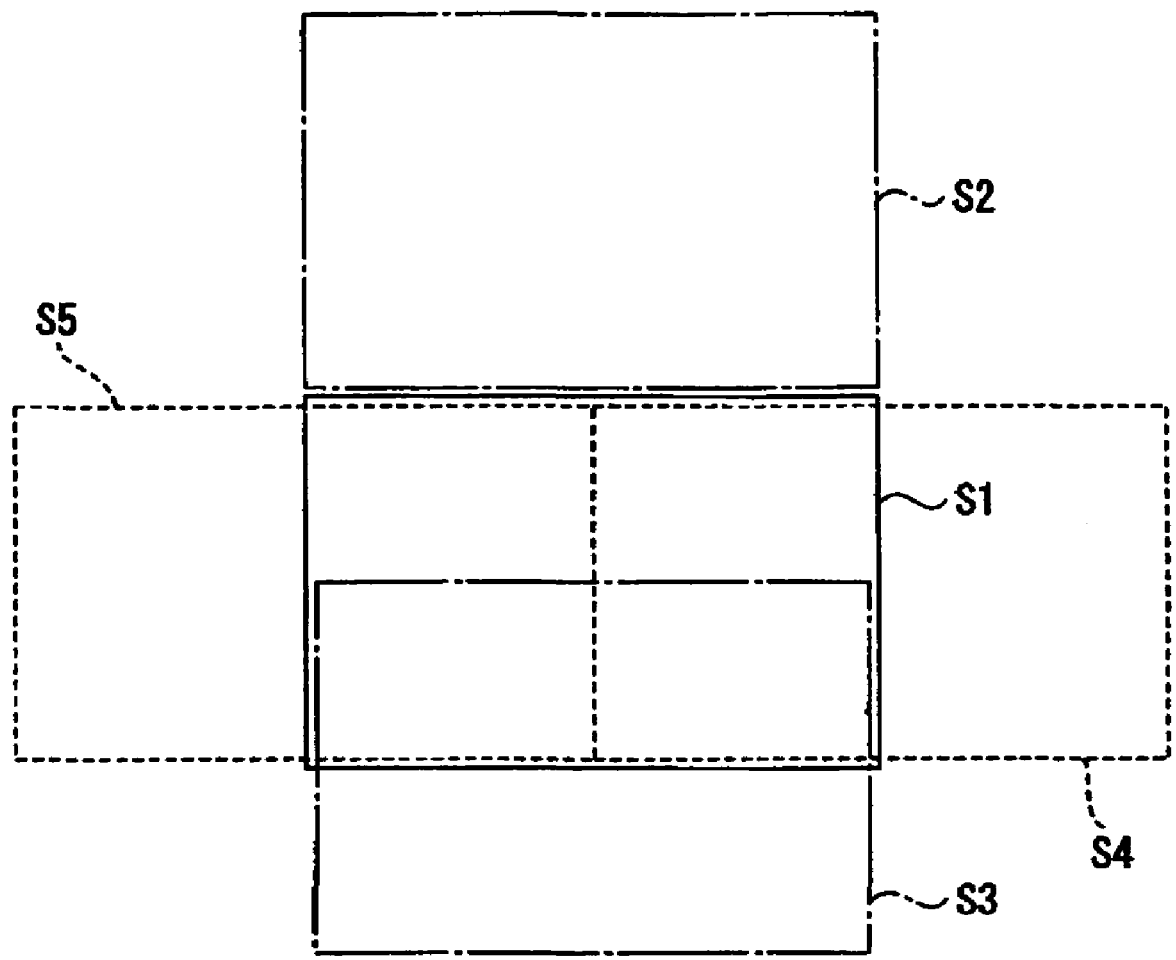
FIG. 9 is a schematic illustration showing a position of an image projected by a projection lens.

As shown in FIG. 9, according to the projection lens position adjuster 30, when the projection lens 3 is moved to the uppermost position (in the Y4 direction), the projection area can shift one screen higher (screen S2) than a screen S1 projected in a case that the projection lens 3 is located on the reference position (approximately the center of the range where the projection lens 3 can move along the Y-axis).

When the projection lens 3 is moved to the lowermost position (in the Y3 direction), the projection area can shift a half screen lower (screen S3) than the screen S1 projected in a case that the projection lens 3 is located on the reference position (approximately the center of the range where the projection lens 3 can move along the Y-axis).

When the projection lens 3 is moved to the rightmost position (in the X3 direction) or the leftmost position (in the X4 direction), the projection area can shift a half screen rightward (screen S4) or leftward (screen S5) as compared to the screen S1 projected in a case that the projection lens 3 is located on the reference position (approximately the center of the range where the projection lens 3 can move along the X-axis).

Figure 10:
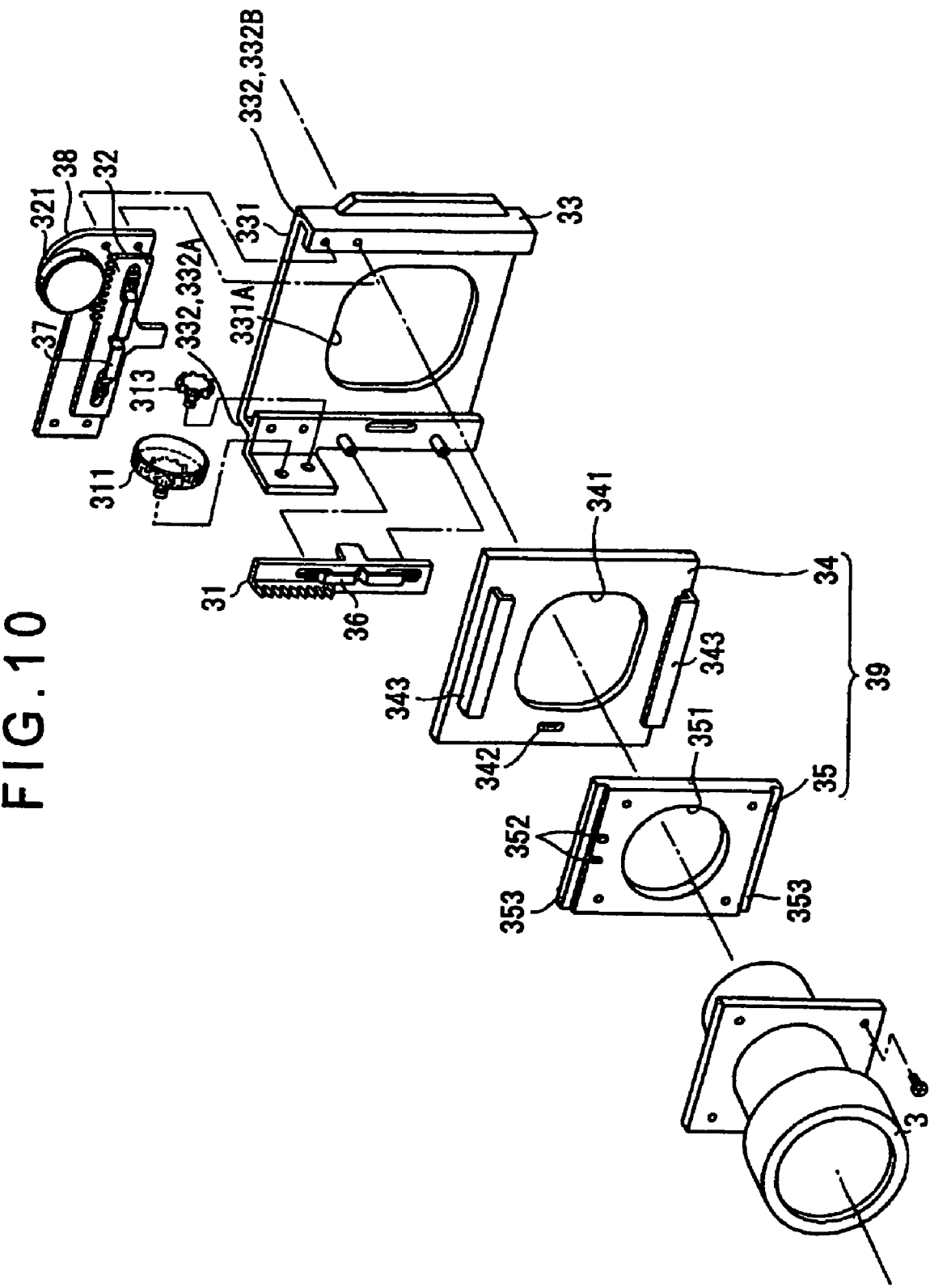
FIG. 10 is a schematic perspective view showing the projection lens position adjuster.

As shown in FIGS. 8 and 10, the projection lens position adjuster 30, which is fixed to the exterior case 2, includes a base 33 disposed by abutting on the rib 22A6 (FIG. 4), a mount 39 having a Y-table 34 and an X-table 35 both sliding on the base 33, a Y-table driver 31 causing the Y-table 34 of the mount 39 to slide on the base 33, and an X-table driver 32 causing the X-table 35 to slide on the base 33.

Figure 11:
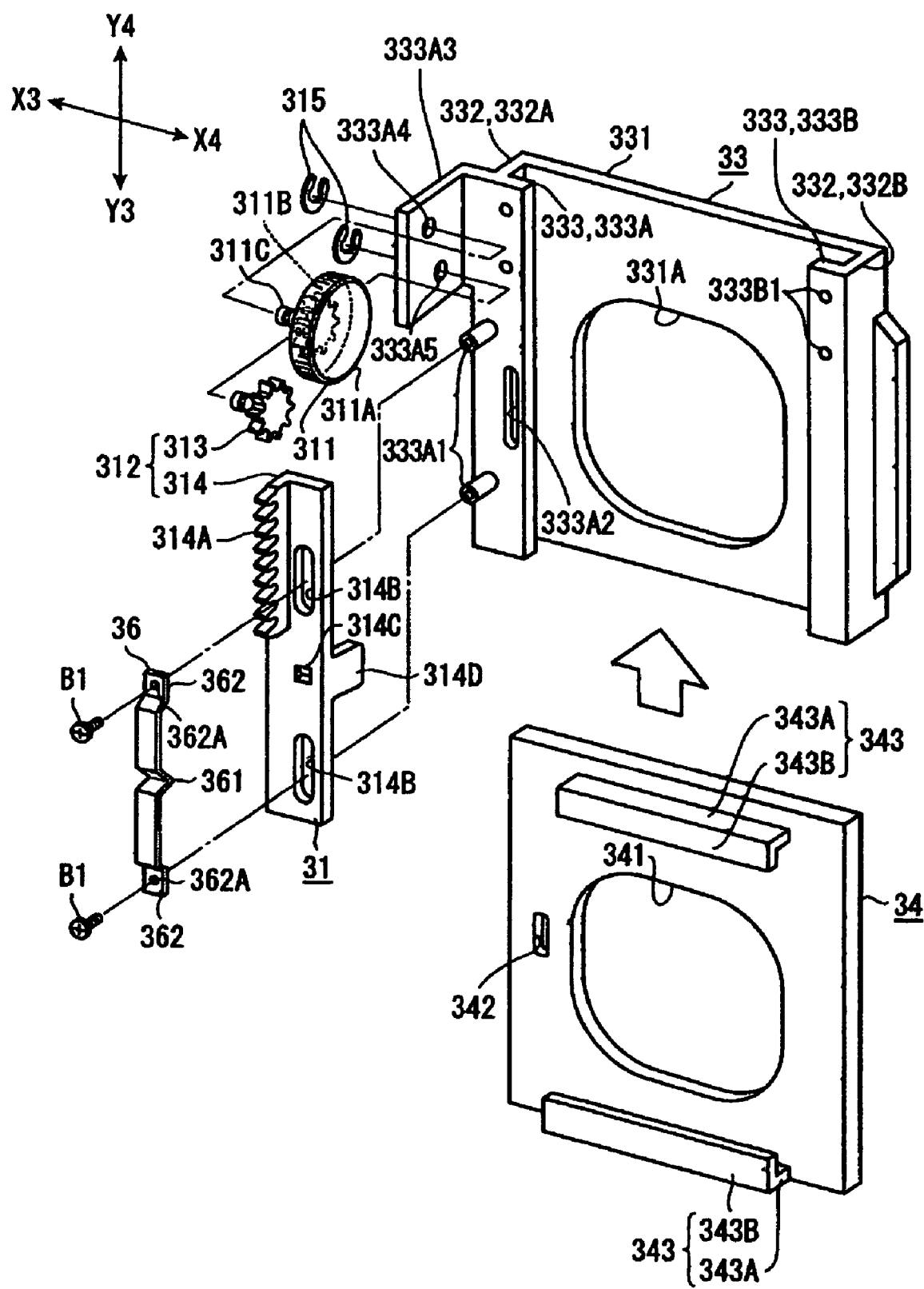
FIG. 11 is a schematic perspective view showing a primary portion of the projection lens position adjuster.

Also, as shown in FIGS. 10 and 11, the base 33 has a base body 331 of an approximately planarly-viewed rectangular plate, and extended parts 332 extending from both ends of the base body 331 toward the Y-table 34 to be approximately orthogonal to the base body 331.

An approximately square hole 331A is formed approximately at the center of the base body 331 so that the projection lens 3 is inserted to the hole 331A and also moves inside the hole 331A. The hole 331A determines the range where the projection lens 3 can move.

Each distal end 333 in an extending direction of the extended part 332 is arranged approximately in parallel to the base body 331. Edge of the Y-table 34 in the X-axis direction are inserted to each part between the distal ends 333 and the base body 331.

An extended part 332A out of the extended parts 332 has a T-shaped cross-section. A pair of bosses 333A1 are formed at a distal end 333A of the extended part 332A. The boss 333A1 is inserted to an elongated hole 314B provided on a Y-slider 314 of the below-described Y-table driver 31. An elongated hole 333A2 extending in the Y-axis direction is formed at the distal end 333A.

An attachment piece 333A3 approximately orthogonal to the distal end 333A is formed at an upper part of the distal end 333A. Holes 333A4 and 333A5 are formed at the attachment piece 333A3 to fix a dial 311 and a gear 313 (described below) of the Y-table driver 31.

Another extended part 332B of the extended parts 332 has an approximately L-shaped cross-section, with holes 333B1 for fixing a below-described attachment 38 formed.

The mount 39 for attaching the projection lens 3 and for sliding on the base 33 includes the Y-table 34 that slides on the base 33 in the Y-axis direction and the X-table 35 that slides in the direction orthogonal to the sliding direction of the Y-table 34 (in the X-direction).

Figure 12:
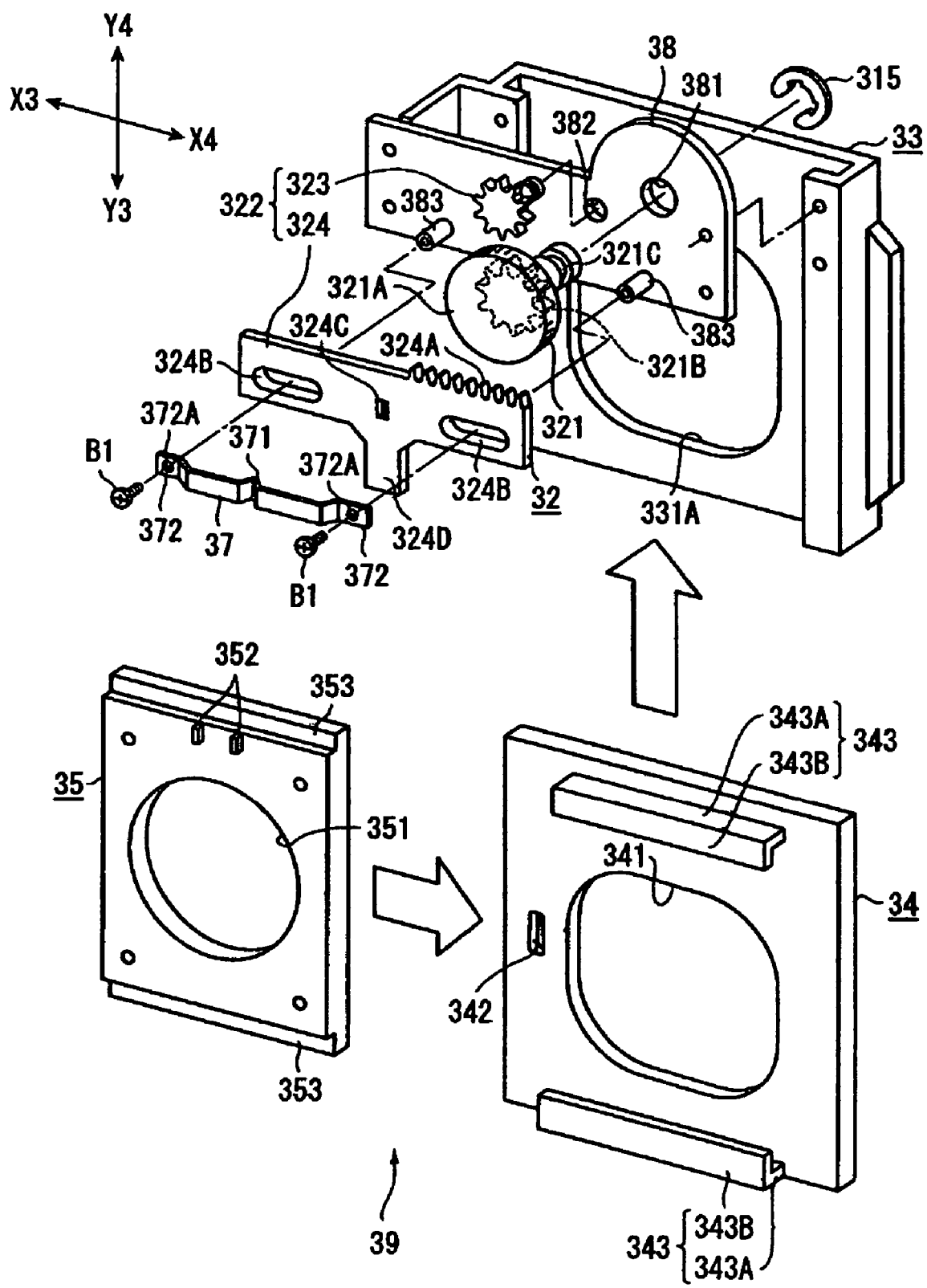
FIG. 12 is a schematic perspective view showing the projection lens position adjuster.
Figure 13:
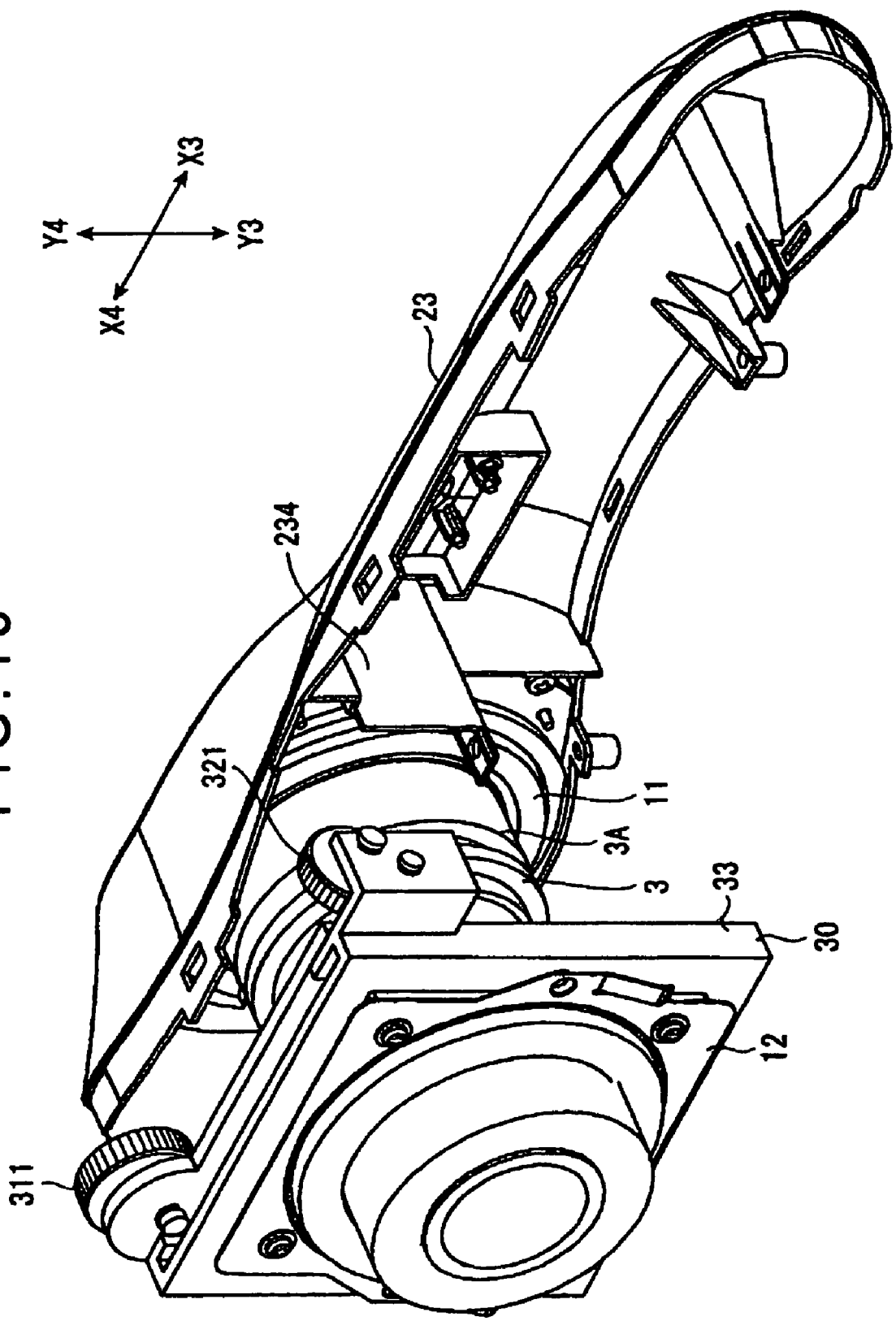
FIG. 13 is a schematic perspective view showing the projection lens with first and second light shields attached.

As shown in FIGS. 11 and 12, the Y-table 34 is an approximately planarly-viewed rectangular plate with dimensions of edges in the Y-axis and X-axis directions being shorter than those of the base 33. Both ends of the Y-table 34 in the X-axis direction are inserted to each part between the distal ends 333 and the base body 331 of the base 33, so that the Y-table 34 slides on the base 33 in the Y-axis direction. An approximately ellipsoidal hole 341 extending in the X-axis direction is formed approximately at the center of the Y-table 34. The smaller diameter (diameter in the Y-axis direction) of the hole 341 is approximately the same as the diameter of the projection lens 3 while the larger diameter thereof (diameter in the X-axis direction) is approximately the same as the length of the hole 331A of the base 33 in the X-axis direction. The projection lens 3 is inserted to the hole 341.

An approximately rectangular hole 342 is formed at the Y-table 34 adjacent to the hole 341. The hole 342 is used for fixing the Y-slider 314 to the Y-table 34.

Attached to the Y-table 34 are a pair of pieces 343 vertically (in the Y-axis direction) and oppositely disposed sandwiching the hole 341. Each piece 343 having an approximately L-shaped cross-section includes a perpendicular part 343A disposed orthogonal to the Y-table 34 and a parallel part 343B provided at the perpendicular part 343A extending approximately parallel to the Y-table 34. Ends of the X-table 35 are inserted to each part between the parallel part 343B and the Y-table 34.

As shown in FIG. 12, the X-table 35 is a planarly-viewed rectangular plate with the external dimension thereof being smaller than that of the Y-table 34.

An approximately circular hole 351 where the projection lens 3 is inserted thereto to be held thereby is formed approximately at the center of the X-table 35. Namely, the projection lens 3 is attached to the X-table 35. A pair of projections 352 are formed above the hole 351 of the X-table 35. Both ends 353 of the X-table 35 in the Y-axis direction are cut out, so that the thickness of the both ends 353 are smaller than other parts. The ends 353 are respectively inserted to the pieces 343 of the Y-table 34 in order that the ends 353 of the X-table 35 slide inside the pieces 343. In other words, the X-table 35 slides on the base 33 via the Y-table 34.

As shown in FIG. 11, the Y-table driver 31 for linearly driving the Y-table 34 on the base 33 includes the dial 311 and a transmitter 312 (first transmitter) to transmit the rotation of the dial 311 to the Y-table 34.

The dial 311 has an approximately columnar dial body 311A exposed through a hole for the dial provided at the upper side 21A of the upper case 21 of the exterior case 2 (FIG. 1), a gear section 311B attached to a circular face of the dial body 311A, and a shaft 311C attached to the gear section 311B.

The shaft 311C is inserted to the hole 333A4 of the attachment piece 333A3 of the base 33, and fixed by a fixing ring 315.

The transmitter 312 includes a gear 313 that meshes with the gear section 311B of the dial 311 and the Y-slider 314 that meshes with the gear 313 to slide as the gear 313 rotates.

A shaft of the gear 313 is inserted to the hole 333A5 of the attachment piece 333A3 of the base 33, and fixed by the fixing ring 315.

The Y-slider 314 is an elongated component extending in the Y-axis direction, with a part of an end in the shorter-side direction is bent opposite to the base 33. The bent part is cut like sawtooth to serve as a meshing section 314A for meshing with the gear 313.

A pair of elongated holes 314B extending along the longitudinal direction of the Y-slider 314 and a recess 314C are formed on the Y-slider 314.

The bosses 333A1 of the base 33 are inserted to the elongated holes 314B.

The recess 314C is formed between the pair of elongated holes 314B with its cross-section being V-shaped. A projection 314D is formed at the approximately center of the other end of the Y-slider 314 in the shorter-side direction. The projection 314D extends toward the base 33 to be fitted to the hole 342 of the Y-table 34 and also inserted to the elongated hole 333A2 of the base 33.

An elongated spring piece (biasing member) 36 extending in the Y-axis direction is attached on the Y-slider 314. Both ends 362 of the spring piece 36 in the longitudinal direction are bent to be approximately L-shaped. Holes 362A where screws B1 are inserted are formed at the both ends 362, so that the screws B1 are inserted to the bosses 333A1 through them and the elongated holes 314B. Accordingly, the spring piece 36 is fixed to the bosses 333A1 of the base 33. Thus, the spring piece 36 would not move as the Y-slider 314 slides.

Approximately the center part of the spring piece 36 in the longitudinal direction is dented in a V-shape to serve as a protrusion 361 projected toward the Y-slider 314. The protrusion 361 is biased toward the Y-slider 314 to abut on the Y-slider 314, so that the protrusion 361 engages with the recess 314C of the Y-slider 314 when the Y-slider 314 slides to move the projection lens 3 to a reference position, for instance, approximately to the center in the Y-axis direction.

Specifically, according to the present exemplary embodiment, the spring piece 36 with the protrusion 361 formed and the Y-slider 314 with the recess 314C formed serve as a recognizer for recognizing the reference position in the Y-axis direction (approximately the center in the Y-axis direction).

As shown in FIG. 12, the X-table driver 32 for linearly driving the X-table 35 on the base 33 includes a dial 321 and a transmitter 322 (second transmitter) to transmit the rotation of the dial 321 to the X-table 35.

The dial 321, which has a configuration approximately the same as the dial 311, includes an approximately columnar dial body 321A exposed through a hole for the dial provided at the upper side 21A of the upper case 21 (FIG. 1), a gear section 321B attached to a circular face of the dial body 321A, and a shaft 321C attached to the gear section 321B.

The dial 321 is fixed on the base 33 through a platy attachment 38. Specifically, the dial 321 is fixed by inserting a shaft 321C of the dial 321 to a hole 381 and attaching a fixing ring 315. It is to be noted that a hole 382 is also provided adjacent to the hole 381, so that a shaft of the gear 323 is inserted thereto.

The transmitter 322 includes a gear 323 that meshes with the gear section 321B of the dial 321 and the X-slider 324 that meshes with the gear 323 to slide as the gear 323 rotates.

The X-slider 324 is an elongated component extending in the X-axis direction, with a part of an elongated edge thereof being cut like sawtooth. The sawtooth part serves as a meshing section 324A which meshes with the gear 323.

A pair of elongated holes 324B extending along the longitudinal direction of the X-slider 324 and a recess 324C are formed on the X-slider 324.

A pair of bosses 383 formed on the attachment 38 are inserted to the elongated holes 324B.

The recess 324C is formed between the pair of elongated holes 324B with its cross-section being V-shaped.

An extended part 324D extending downward in FIG. 12 is formed approximately at the center of the other longitudinal edge of the X-slider 324. The elongated part 324D is fitted to a part between the projections 352 of the X-table 35.

Since the X-table 35 is disposed on the Y-table 34, the X-table 35 moves downward when the Y-table 34 moves downward. At this time, the extended part 324D of the X-slider 324 slides between the projections 352, however, the extended part 324D still has a length not to be released from the projections 352 even when the X-table 35 moves to the lowermost position. Namely, the length of the extended part 324D in the extending direction is longer than a distance where the X-table 35 can vertically move.

An elongated spring piece (biasing member) 37 extending in the X-axis direction is attached on the X-slider 324. The spring piece 37 is formed approximately the same as the spring piece 36, with both ends 372 of the spring piece 37 in the longitudinal direction are bent to be approximately L-shaped. Holes 372A where screws B1 are inserted are formed on each end 372, so that the screws B1 are inserted to the pair of bosses 383 formed on the attachment 38 through the elongated holes 324B. Thus, the spring piece 37 is fixed to the attachment 38 fixed on the base 33.

Approximately the center part of the spring piece 37 in the longitudinal direction is dented in a V-shape to serve as a protrusion 371 projected toward the X-slider 324. The protrusion 371 is biased toward the X-slider 324 to abut on the X-slider 324, so that the protrusion 371 engages with the recess 324C of the X-slider 324 when the X-slider 324 slides to move the projection lens 3 to a reference position, for instance, to approximately the center in the X-axis direction.

Specifically, according to the present exemplary embodiment, the spring piece 37 with the protrusion 371 formed and the X-slider 324 with the recess 324C formed serve as a recognizer for recognizing the reference position in the X-axis direction (approximately the center in the X-axis direction).

The position adjustment of the projection lens 3 by the projection lens position adjuster 30 will be described below with reference to FIGS. 8, 11 and 12 mainly.

Firstly, the movement of the projection lens 3 in the Y-axis direction will be described.

It is assumed that the projection lens 3 is positioned at the uppermost position in the Y-axis direction.

A part of the dial 311 exposed from the exterior case 2 is rotated downward (in the Y1 direction in FIG. 1), i.e., the dial 311 is rotated in a direction shown by an arrow R1 in FIG. 8. With the rotation, the gear 313 is rotated in an R2 direction. The rotation of the gear 313 causes the Y-slider 314 sliding downward (in the Y3 direction). The bosses 333A1 then slide inside the elongated holes 314B of the Y-slider 314. The projection 314D of the Y-slider 314 slides inside the elongated hole 333A2 of the base 33.

Since the projection 314D is fitted to the hole 342 of the Y-table 34, the Y-table 34 also moves downward (in the Y3 direction) as the Y-slider 314 moves. Since the ends of the X-table 35 are inserted to the pieces 343 of the Y-table 34, the X-table 35 moves downward as the Y-table 34 moves. Also, since the projection lens 3 is fixed on the X-table 35, the projection lens 3 moves downward (in the Y3 direction) concurrently.

Note that, the spring piece 36 is fixed on the base 33, so that the spring piece 36 would not be moved even when the Y-slider 314 is moved. The protrusion 361 of the spring piece 36 abuts on the Y-slider 314, and consequently, friction may be created between the protrusion 361 and the Y-slider 314.

Further, when the dial 311 is rotated so that the projection lens 3 is moved approximately to the center in the Y-axis direction of the hole 331A formed on the base 33, the protrusion 361 of the spring piece 36 engages with the recess 314C of the Y-slider 314. Accordingly, the friction created between the protrusion 361 of the spring piece 36 and the Y-slider 314 is reduced, thus reducing a rotation torque of the dial 311.

When the dial 311 is further rotated, the engagement between the protrusion 361 of the spring piece 36 and the recess 314C of the Y-slider 314 is released, thus causing large friction again between the protrusion 361 and the Y-slider 314.

Next, the movement of the projection lens 3 in the X-axis direction will be described.

It is assumed that the projection lens 3 is positioned at the rightmost position when the projector 1 as seen from the rear side.

A part of the dial 321 exposed from the exterior case 2 is rotated leftward as seen from the rear side of the projector 1 (in the X2 direction in FIG. 1), i.e., the dial 321 is rotated in a direction shown by an arrow R3 in FIG. 8. With the rotation of the dial 321, the gear 323 is rotated in an R4 direction. As the gear 323 is rotated, the X-slider 324 moves leftward (in the X4 direction) as seen from the rear side of the projector 1. The bosses 383 of the attachment 38 slide inside the elongated holes 324B of the X-slider 324.

Since the extended part 324D of the X-slider 324 is fitted to the part between the projections 352 of the X-table 35, the X-table 35 slides on the Y-table 34 as the X-slider 324 moves. The projection lens 3 concurrently moves leftward (in the X4 direction).

Note that the spring piece 37 is fixed to the bosses 383 of the attachment 38 not to move along with the movement of the X-slider 324. The protrusion 371 of the spring piece 37 abuts on the X-slider 324, and consequently, friction may be created between the protrusion 371 and the X-slider 324.

Further, when the dial 321 is rotated so that the projection lens 3 is moved approximately to the center in the X-axis direction of the hole 331A formed on the base 33, the protrusion 371 of the spring piece 37 engages with the recess 324C of the X-slider 324. Accordingly, the friction created between the protrusion 371 of the spring piece 37 and the X-slider 324 is reduced, thus reducing a rotation torque of the dial 321.

When the dial 321 is further rotated, the engagement between the protrusion 371 of the spring piece 37 and the recess 324C of the X-slider 324 is released, thus causing large friction again between the protrusion 371 and the X-slider 324.

While it is described in this exemplary embodiment the case that the projection lens 3 moves from the uppermost position to the lowermost position, and that the projection lens 3 moves from the right side to the left side as seen from the rear side of the projector 1, alternatively, the same description can be applied when the projection lens 3 moves from the lowermost position to the uppermost position, and when the projection lens 3 moves from the left side to the right side.

(4) Light Shielding Mechanism

Now, the light shielding structure of the projection lens 3 will be described below with reference to FIGS. 13 to 16.

What provided around the projection lens 3 are the first light shield 11 for closing the gap between the opening 231 of the front case 23 and the periphery of the projection lens 3, and the second light shield 12 for closing the gap between the projection lens 3 and the hole 331A of the base 33 of the projection lens position adjuster 30.

Figure 14:
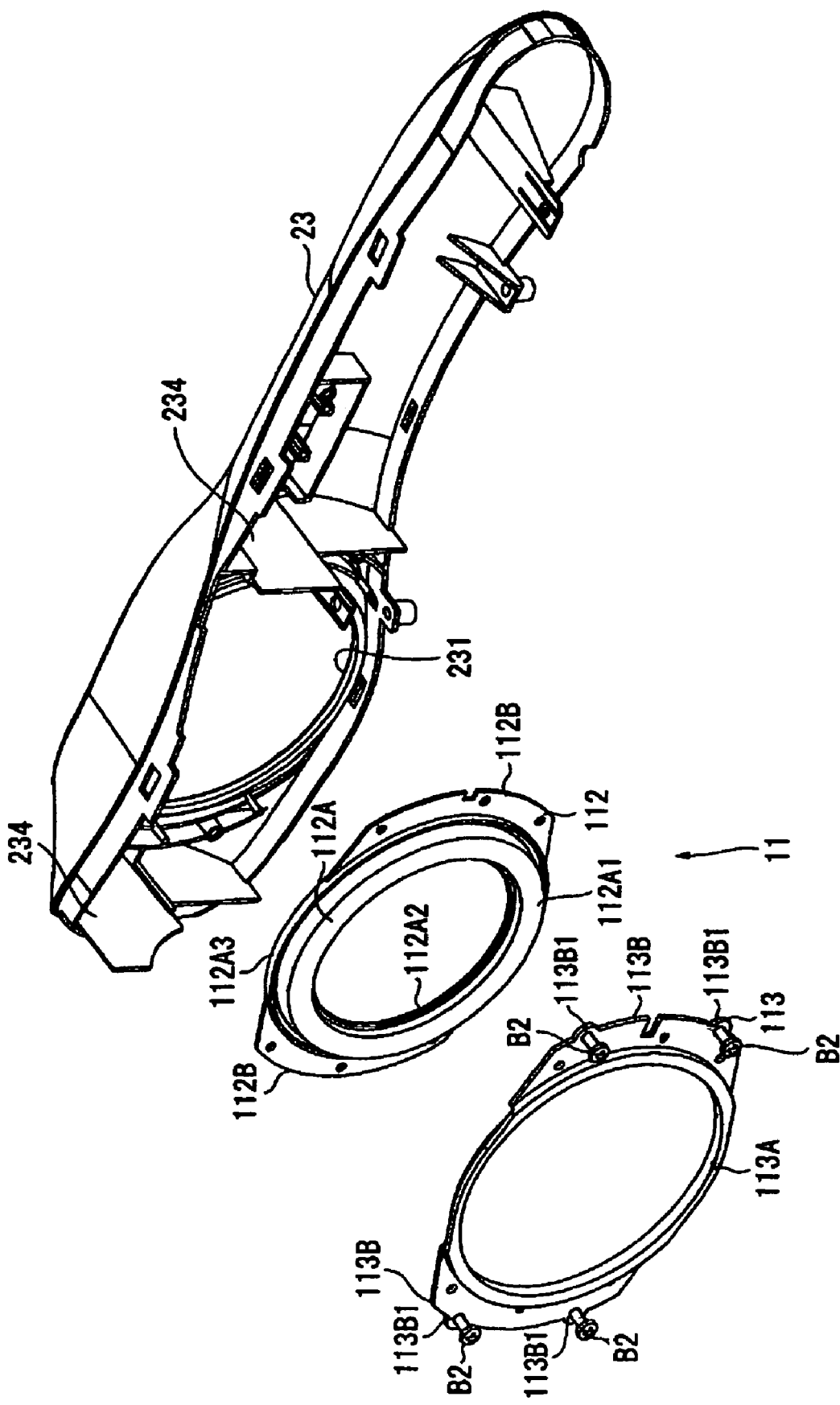
FIG. 14 is a schematic perspective view showing the first light shield.
Figure 15:
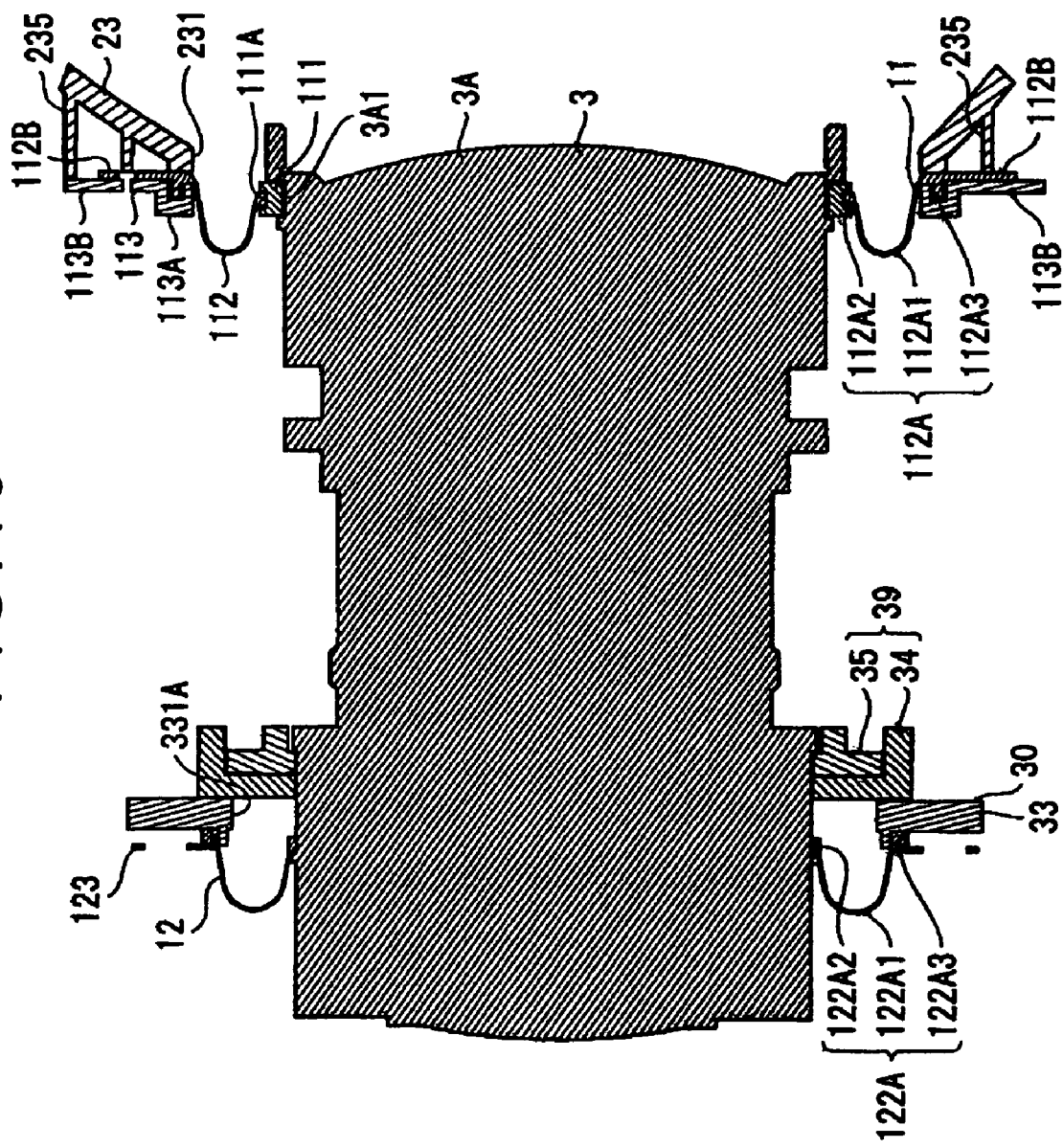
FIG. 15 is a schematic cross section of the projection lens, the first light shield and the second light shield.

As shown in FIGS. 14 and 15, the first light shield 11 has a ring 111, a shield body 112 and a fixing plate 113.

The ring 111 is held at a groove 3A1 circularly formed on the periphery of a lens-holding barrel 3A of the projection lens 3 in a loosely fitted manner. Thus, even if the lens-holding barrel 3A of the projection lens 3 is rotated at the focus adjustment etc., the ring 111 would not be rotated. A groove 111A having an approximately angular C-shaped cross-section is formed at the periphery of the ring 111.

The shield body 112, which is attached on the periphery of the ring 111, includes a ring-shaped elastic member 112A and a pair of attachment pieces 112B extending outward from the elastic member 112A.

The elastic member 112A is disposed to extend between the ring 111 and a peripheral edge of the opening 231 of the front case 23. The elastic member 112A is made of a thin platy rubber dented opposite to the front case 23, the elastic member 112A equipped with a deformable part 112A1 having an approximately U-shaped cross-section orthogonal to a radial direction of the projection lens 3, and attachments 112A2 and 112A3 respectively disposed on the internal peripheral edge and the external peripheral edge of the deformable part 112A1.

The deformable part 112A1 deformable along with the position adjustment of the projection lens 3 is formed thinner than the attachments 112A2 and 112A3.

The attachment 112A2 disposed on the internal peripheral edge of the deformable part 112A1 is inserted to the groove 111A of the ring 111 to be fixed thereon.

The attachment 112A3 disposed on the external peripheral edge of the deformable part 112A1 is bent opposite to the front case 23 to be inserted to a dented part of the fixing plate 113 (described below). The fixing plate 133 is fixed on the peripheral edge of the front case 23, so that the deformable part 112A1 of the shield body 112 closes the gap between the ring 111 attached no the projection lens 3 and the opening 231 of the front case 23.

The attachment piece 112B is fixed on the external peripheral edge of the deformable part 112A1, and disposed along the peripheral edge of the deformable part 112A1. The attachment piece 112B is used for attaching the shield body 112 to the front case 23.

The fixing plate 113 used for fixing the shield body 112 to the front case 23, is disposed on the shield body 112 opposite to the front case 23. The fixing plate 113 includes a ring 113A to which the projection lens 3 is inserted, and a fixing piece 113B extending outward from the ring 113A. The ring 113A is dented opposite to the shield body 112, so that the attachment 112A3 disposed on the external peripheral edge of the deformable part 112A1 of the shield body 112 is inserted to the dented part.

The fixing piece 113B is fixed to the front case 23, with holes 113B1 for inserting screws B2 being formed. When the fixing piece 113B is fixed to the front case 23, the attachments 112B and 112A3 of the shield body 112 are sandwiched to be fixed between the fixing piece 113B and a rib 235 which is formed on the peripheral edge of the opening 231 of the front case 23.

With the configuration of the above-described first light shield 11, when the projection lens 3 is moved, the deformable part 112A1 of the shield body 112 is deformed. For example, when the projection lens 3 is moved upward (in the Y4 direction in FIG. 13), an upper part of the deformable part 1112A1 is compressed whereas a lower part thereof is stretched.

Figure 16:
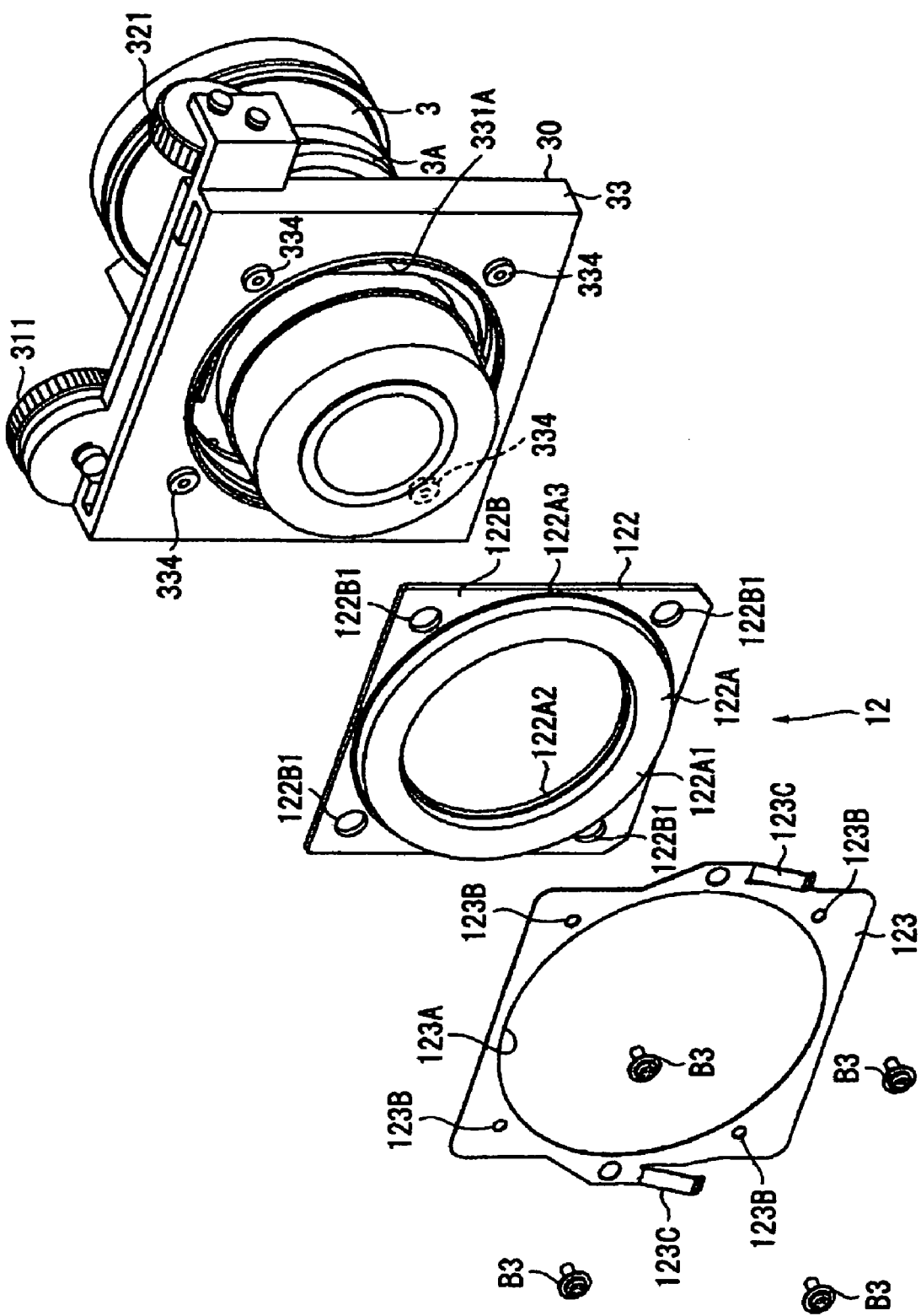
FIG. 16 is a schematic perspective view showing the second light shield.

Next, the second light shield 12 will be described with reference to FIGS. 15 and 16.

In the above-described projection lens position adjuster 30, when the X-table 35 holding the projection lens 3 is moved leftward (in the X4 direction in FIG. 8) or is moved rightward (in the X3 direction in FIG. 8) as seen from the rear side of the projector 1, a gap may be generated between the X-table 35 and the hole 341 of the Y-table 34, or between the X-table 35 and the hole 331A of the base 33. Accordingly, the light may leak from the gap. The second light shield 12 is provided in order to close the gap. The second light shield 12 attached to the inside of the base 33 of the projection lens position adjuster 30, includes a shield body 122 and a fixing plate 123.

The shield body 122, which is attached on the periphery of the lens-holding barrel 3A of the projection lens 3, includes a ring-shaped elastic member 122A and a attachment piece 122B extending outward from the elastic member 122A.

The elastic member 122A is made of a thin platy rubber dented opposite to the front case 23, the elastic member 122A equipped with a deformable part 122A1 having an approximately U-shaped cross-section orthogonal to the radial direction of the projection lens 3, and attachments 122A2 and 122A3 respectively disposed on the internal peripheral edge and the external peripheral edge of the deformable part 122A1.

The deformable part 122A1 deformable along with the position adjustment of the projection lens 3 is formed thinner than the attachments 122A2 and 122A3.

The attachment 122A2 disposed on the internal peripheral edge of the deformable part 122A1 is fixed to the periphery of the lens-holding barrel 3A of the projection lens 3.

The attachment 122A3 disposed on the external peripheral edge of the deformable part 122A1 is fixed to the peripheral edge of the hole 331A of the base 33 of the projection lens position adjuster 30. Accordingly, the deformable part 122A1 closes the gap between the periphery of the projection lens 3 and the hole 331A of the base 33.

The attachment 122B is a rectangular plate, where holes 122B1 to be inserted to the bosses 334 formed on the base 33 are formed.

The fixing plate 123 used for fixing the shield body 122 to the base 33, is disposed on the shield body 122 opposite to the base 33.

The fixing plate 123 is an approximately planarly-viewed rectangular sheet-metal, with a circular opening 123A for inserting the projection lens 3 being formed at the center thereof. A pair of spring pieces 123C are provided on the fixing plate 123 approximately at the center of the end along the Y-axis direction.

Holes 123B for inserting screws B3 are formed on four corners of the fixing plate 123. When the screws B3 are inserted to the holes 123B to fix the fixing plate 123 to the base 33, the attachment 122A3 and the attachment piece 122B of the shield body 122 are sandwiched between the peripheral edge of the opening of the fixing plate 123 and the base 33.

With the configuration of the above-described second light shield 12, when the projection lens 3 is moved, the deformable part 122A1 of the shield body 122 is deformed. For example, when the projection lens 3 is moved upward (in the Y4 direction in FIG. 13), an upper part of the deformable part 122A1 is compressed whereas a lower part thereof is stretched.

(5) Advantages of the Exemplary Embodiment

According to the present exemplary embodiment, following advantages can be obtained.

(5-1) When the part of the dial 311 of the projection lens position adjuster 30 exposed form the exterior case 2 is moved downward (in the Y1 direction), the projection lens 3 is moved downward (in the Y3 direction). When the part of the dial 311 exposed from the exterior case 2 is moved upward (in the Y2 direction), the projection lens 3 is moved upward (in the Y4 direction). Further, when the part of the dial 321 exposed from the exterior case 2 is moved rightward (in the X1 direction) as seen from the rear side of the projector 1, the projection lens 3 is moved rightward (in the X3 direction) as seen from the rear side of the projector 1. When the part of the dial 321 exposed from the exterior case 2 is moved leftward (in the X2 direction) as seen from the rear side of the projector 1, the projection lens 3 is moved leftward (in the X4 direction) as seen from the rear side of the projector 1.

As described above, as seen from the projector 1, since the direction where the projection lens 3 is moved and the direction where the dials 311 and 321 are rotated are correspondent, the moving direction of the projection lens 3 can easily be recognized. Accordingly, a user may smoothly adjust the position of the projection lens 3.

Especially, when the projection lens 3 is moved in two directions orthogonal to each other, the user is difficult to recognize the moving direction of the projection lens 3 in a case that the rotary direction of the dial and the moving direction of the projection lens 3 are not correspondent, thus confusing the user. However, in the present exemplary embodiment, since the rotary direction of the dials 311 and 321 and the moving direction of the projection lens 3 are approximately correspondent, the user can easily recognize the moving direction of the projection lens 3, thus enhancing or improving usability.

(5-2) In the present exemplary embodiment, the rotation of the dials 311 and 321 can be converted into the linear driving only by providing the gears 313 and 323 respectively between the dials 311, 321 and the sliders 314, 324, so that the moving direction of the projection lens 3 and the rotary direction of the dials 311 and 321 can be correspond as seen from the rear side of the projector 1, thus simplifying the structure of the projection lens position adjuster 30.

(5-3) Since the recognizer for recognizing the reference position of the projection lens 3 is provided at the projection lens position adjuster 30, the recognizer changing the rotation torque of the dials 311 and 321, i.e., the recognizer changing the force necessary for rotating the dials 311 and 321, the position of the projection lens 3 can easily be recognized while rotating the dials 311 and 321. Specifically, the protrusions 361 and 371 of the spring pieces 36 and 37 are biased toward and abutted on the Y-slider 314 and the X-slider 324 until the projection lens 3 reaches the reference position, friction is created between the protrusions 361, 371 and the Y-slider 314, X-slider 324. The friction is the rotation torque of the dials 311 and 321. When the projection lens 3 reaches the reference position, the recesses 314C, 324C and the protrusions 361, 371 are respectively engaged, so that the rotation torque of the dials 311 and 321 are reduced. Thus, the reference position of the projection lens 3 can easily be recognized.

The easy recognition enhances or improves the usability for the user.

(5-4) Further, since the reference position the projection lens 3 can be recognized only by engaging the recesses 314C, 324C with the protrusions 361, 371, the structure of the projection lens position adjuster 30 would not be complicated even if the recognizer is provided for recognizing the reference position.

(5-5) Since the recesses 314C and 324C are respectively formed on the X-slider 324 of the transmitter 322 and the Y-slider 314 of the transmitter 312 directly connected to the dials 311 and 321, the change of the friction when the recesses 314C, 324C and the protrusions 361, 371 are engaged can directly be transmitted to the dials 311 and 321. Accordingly, the change of the rotation torque of the dials 311 and 321 can securely be recognized by the user, thus further enhancing or improving the usability.

(5-6) Since the reference position where the recesses 314C, 324C engage with the protrusions 361, 371 is approximately the mid position in the moving direction of the projection lens 3, the user can easily recognize the center. Accordingly, easy recognition of the center can be effective especially when the user uses the projector 1 with an optical axis of the projection lens 3 thereof corresponding to the center of the projected image on the screen.

(5-7) Since the protrusions 361, 371 and the recesses 314C, 324C have approximately V-shaped cross sections, when the engagement between the recesses 314C, 324C and the protrusions 361, 371 are released, it can be conducted only by moving the recesses 314C, 324C from the engagement state.

(5-8) When the projection lens 3 is moved to the uppermost position by the projection lens position adjuster 30, the projection area can shift one screen higher than a screen projected in a case that the projection lens 3 is located on the reference position. Since the projection area can shift one screen higher, it is possible to project the image with the projector 1 placing at a level lower than usual, for example on the floor. If there is a vaulted ceiling, the projector 1 can be placed on the ceiling upside down to project downward.

When the projection lens 3 is moved to the lowermost position, the projection area can shift a half screen lower than the screen projected in the case that the projection lens 3 is located on the reference position. Accordingly, it is possible to use the projector 1 placing at a level relatively higher than usual, for example on a shelf.

As described above, the projector 1 of the present exemplary embodiment can project the image from the higher level toward the lower level, or from the lower level toward the higher level, so that the level where the projector 1 is placed would not be restricted, thus enhancing or improving the usability of the projector 1.

(5-9) When the projection lens 3 is moved to the rightmost position or the leftmost position by the projection lens position adjuster 30, the projection area can shift a half screen rightward or leftward as compared to the screen projected in the case that the projection lens 3 is located on the reference position. Accordingly, even when the optical axis of the projection lens 3 is deviated rightward or leftward from the center position of the screen, the projector 1 can project the image at the center of the screen pretty securely. With this configuration, the projector 1 can be used in the space where the projector 1 is limited to be placed, such as a small room.

(5-10) Since the first light shield 11 has the elastic member 112A disposed to extend between the ring 111 attached to the projection lens 3 and the peripheral edge of the opening 231 of the front case 23, the gap between the projection lens 3 and the opening 231 can be closed by the elastic member 112A. Accordingly, the light leakage from the gap can be reduced or prevented.

(5-11) Since the elastic member 112A of the first light shield 11 is attached to the ring 111 provided on the projection lens 3, the elastic member 112A is compressed or stretched along with the movement of the projection lens 3. Accordingly, even when the projection lens 3 is moved to adjust the position thereof, the gap between the projection lens 3 and the opening 231 can securely be closed, thus reducing or preventing the light leakage.

Further, since the gap between the projection lens 3 and the opening 231 can securely be closed, the invasion of the dusts from the gap can also be reduced or prevented.

(5-12) Since the first light shield 11 can follow the movement of the projection lens 3 with the elastic member 112A compressed and stretched, a shield plate itself would not follow unlike the related art. Therefore, since the dimension of the exterior case along the moving direction of the projection lens is not required to be longer in order to secure the range where the light shield moves inside the exterior case.

(5-13) Since the ring 111 is held on the outer periphery of the lens-holding barrel 3A of the projection lens 3 in a loosely fitted manner, even if the lens-holding barrel 3A is rotated at the focus adjustment etc., the ring 111 would not be rotated. Since the elastic member 112A is fixed on the ring 111, it can be prevented that the elastic member 112A is twisted along with the rotation of the lens-holding barrel 3A of the projection lens 3.

(5-14) Since the second light shield 12 having the elastic member 122A disposed to extend between the periphery of the projection lens 3 and the peripheral edge of the hole 331A of the base 33 of the projection lens position adjuster 30 is provided, the light leakage from the gap between the projection lens position adjuster 30 and the projection lens 3 can be reduced or prevented.

Since the second light shield 12 has the elastic member 122A fixed to the projection lens 3 in the same manner as the first light shield 11, the elastic member 122A is compressed or stretched to follow the movement of the projection lens 3. Accordingly, even when the projection lens 3 is moved, the gap between the projection lens position adjuster 30 and the projection lens 3 can securely be closed, thus reducing or preventing the light leakage.

(5-15) Since the second light shield 12 can securely close the gap between the projection lens 3 and the projection lens position adjuster 30, the invasion of the dusts from the gap can also be reduced or prevented.

(5-16) Since there are provided two light shields of the first light shield 11 and the second light shield 12, the light leakage and the invasion of the dusts can securely be reduced or prevented.

(5-17) There are provided the rib 234 at the front case 23, the rib 22A6 at the bottom side 22A of the lower case 22 and the rib at the upper side 21A of the upper case 21 of the exterior case 2, to form the lens house with these ribs surrounding around the periphery of the projection lens 3. The ribs 22A6 and the rib of the upper side 21A of the upper case 21 abut on the base 33. Since the second light shield 12 is provided for closing the gap between the projection lens 3 and the hole 331A of the base 33, the lens house is sealed by the second light shield 12. Even when the dusts invade the exterior case 2 through the holes with the dials 311 and 321 being exposed through, the dusts would not invade the optical unit 4 etc. since the lens house is sealed. Accordingly, the adhesion of the dusts to the liquid crystal panel 441 etc. can be reduced or prevented, thus enhancing the reliability of the projector 1.

(5-18) Since the deformable part 112A1 of the first light shield 11 and the deformable part 122A1 of the second light shield 12 are thinned, the form of which can be deformed along with the position adjustment of the projection lens 3. Therefore, providing the light shields 11 and 12 do not make the position adjustment of the projection lens 3 difficult, but the position of the projection lens 3 can smoothly be adjusted with the light shields 11 and 12 provided.

(5-19) If the deformable part is flat instead of the sag structure, the elastic force is largely generated on the deformable part when the deformable part is pulled with large force along with the position adjustment of the projection lens 3, thus the deformable part unlikely following the movement of the projection lens 3.

On the other hand, in the present exemplary embodiment, since the deformable parts 112A1 and 122A1 have approximately U-shaped cross section, and the platy elastic members are sagged. Even when the deformable parts 112A1 and 122A1 are pulled with large force along with the position adjustment of the projection lens 3, the sag of the deformable parts 112A1 and 122A1 is only required to be stretched, and the elastic force is unlikely generated, thus the deformable parts 112A1 and 122A1 easily following the movement of the projection lens 3.

Since the deformable parts 112A1 and 122A1 easily follow the movement of the projection lens 3, the position adjustment of the projection lens 3 is unlikely to be difficult.

(5-20) Since the attachment 112A3 of the elastic member 112A of the first light shield 11 is sandwiched between the fixing plate 113 and the front case 23, the elastic member 112A can securely be fixed. Similarly, since the attachment 122A3 of the elastic member 122A of the second light shield 12 is sandwiched between the fixing plate 123 and the base 33, the elastic member 122A can securely be fixed.

(5-21) Since the attachment 112A2 is formed to be thick, the attachment 112A2 can be fitted to the groove 111A of the ring 111 to be securely fixed to the ring 111.

Since the attachment 112A3 is also formed to be thick, the attachment 112A3 can securely be fitted to the dented part of the ring 113A of the fixing plate 113, thus securely fixing the attachment 112A3 between the fixing plate 113 and the front case 23. As described above, since the attachments 112A2 and 112A3 of the elastic member 112A of the shield body 112 can securely be fixed to the ring member 111 and the front case 23, the attachments 112A2 and 112A3 would not be detached from the ring 111 and the front case 23 along with the position adjustment of the projection lens 3, and consequently, the gap between the projection lens 3 and the opening 231 of the front case 23 can securely shield the light.

Similarly, since the attachments 122A2 and 122A3 are also formed to be thick, the attachments 122A2 and 122A3 can tightly attached to the periphery of the lens-holding barrel 3A of the projection lens 3 and to the base 33, thus securely closing the gap between the projection lens 3 and the projection lens position adjuster 30.

Second Exemplary Embodiment

Next, a second exemplary embodiment of the present invention will be described below. Incidentally, in the following description, the same reference numeral will be attached to the same components as the above to omit the description thereof. Further, in this embodiment, components which are not particularly described herein may be configured in the same manner as the first exemplary embodiment.

Figure 17:
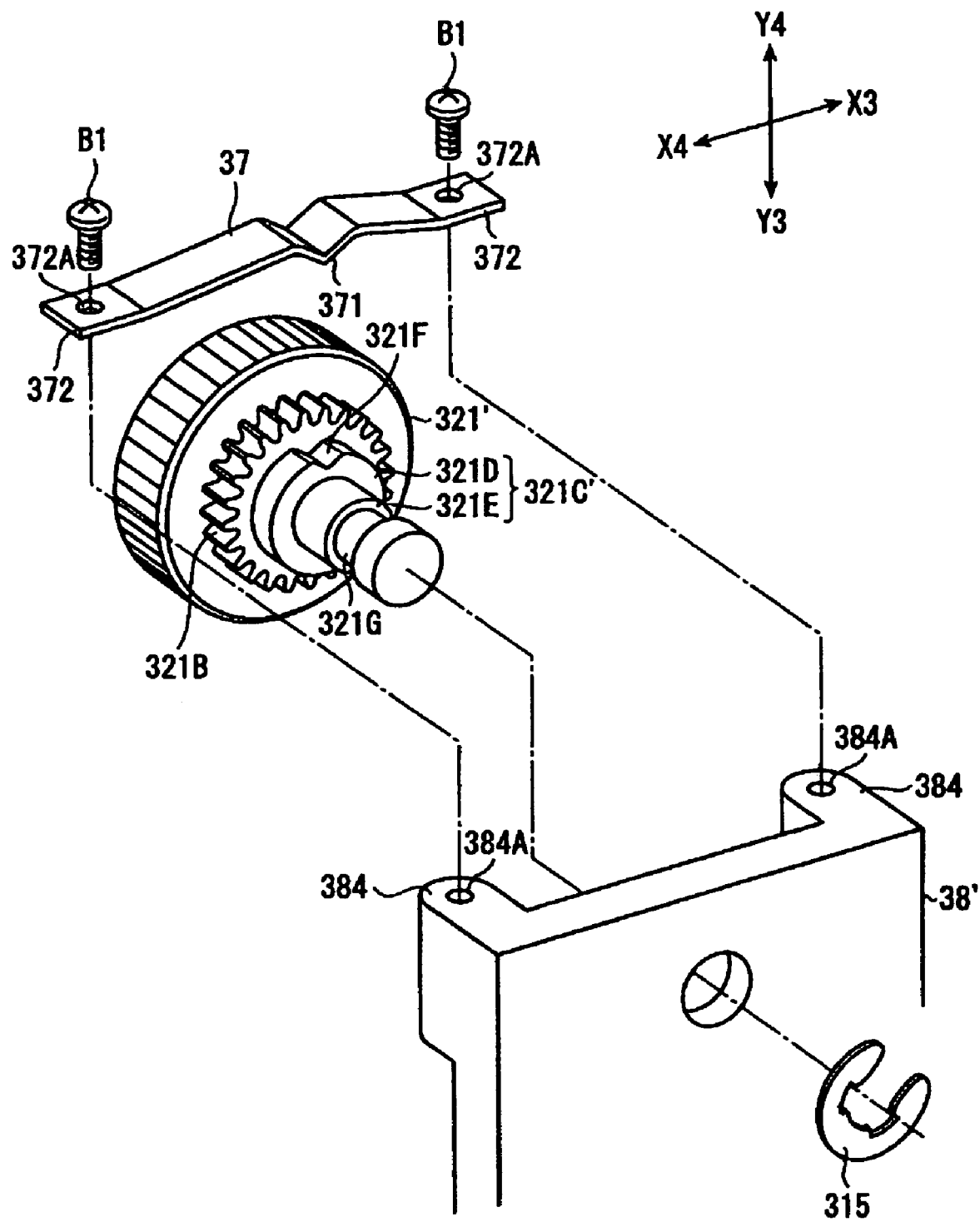
FIG. 17 is a schematic perspective view showing a primary portion of a projection lens position adjuster according to a second exemplary embodiment of the present invention.

In the above exemplary embodiment, the spring piece 37 abuts on the X-slider 324 while the protrusion 371 of the spring piece 37 engages with the recess 324C formed on the X-slider 324. In contrast, in the present exemplary embodiment, as shown in FIG. 17, the protrusion 371 engages with a recess 321F formed on a shaft 321C' of a dial 321'. That is, in the present exemplary embodiment, the recognizer for recognizing the reference position is constituted of the spring piece 37 and the shaft 321C' of the dial 321'.

The shaft 231C' has a large-diameter part 321D attached to the gear section 321B and a small-diameter part 321E attached to the large-diameter part 321D. The recess 321F is formed by cutting a part of the large-diameter part 321D in a V-shape.

A notch 321G is formed along the periphery of the small-diameter part 321E. The fixing ring 315 is attached to the notch 321G.

The dial 321' is attached to an attachment 38'. The attachment 38' has approximately the same structure as the attachment 38 of the above exemplary embodiment, except that a pair of projections 384 projecting toward the dial body 321A are formed thereon.

Holes 384A extending in a direction (the Y-axis direction) orthogonal to the projecting direction of the projection 384 are respectively formed at pair of projections 384. Ends 372 of the spring piece 37 are fixed to the holes 384A by way of screws B1.

The protrusion 371 of the spring piece 37 fixed on the projections 384 is biased toward the large-diameter part 321D of the dial 321' to abut on the large-diameter part 321D.

In the present exemplary embodiment, the projection lens 3 is moved from an end in the movable range in the X-axis direction (e.g., the rightmost position as seen from the rear side of the projector 1) to the other end (the leftmost position as seen from the rear side of the projector 1) by the dial 321' rotating for 2.2 rounds.

Figure 18:
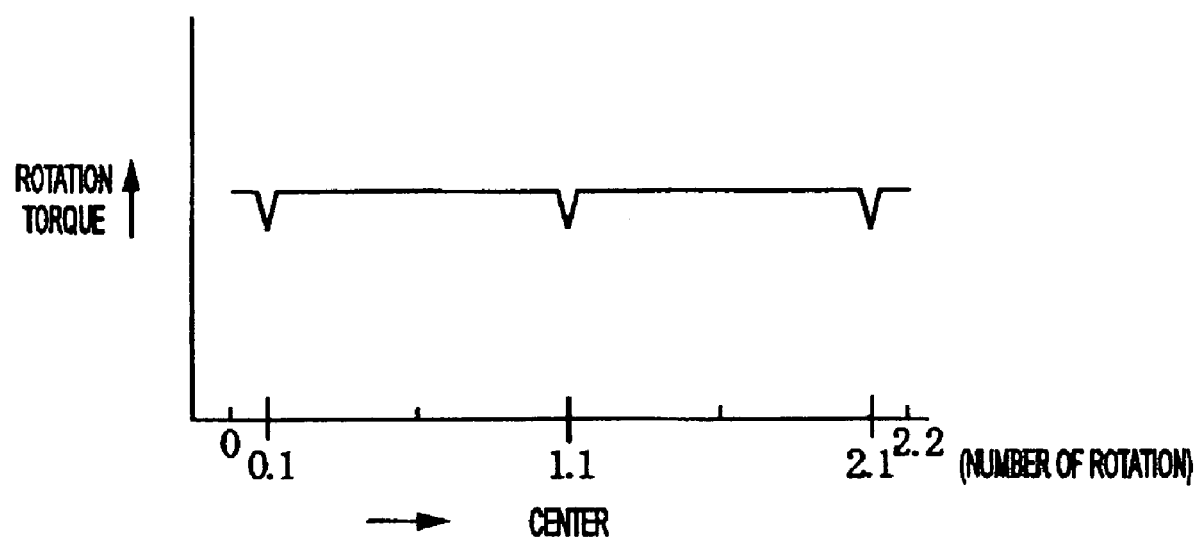
FIG. 18 is a schematic illustration showing a relationship between a number of rotation of a dial and a rotation torque of the second exemplary embodiment.

The movement of the projection lens 3 in the X-axis direction will be described below with reference to FIG. 18.

It is assumed that the projection lens 3 is positioned at the rightmost position when the projector 1 as seen from the rear side.

Firstly, the dial 321' is rotated leftward as seen from the rear side of the projector 1 (in the X2 direction in FIG. 1). Since the protrusion 371 of the spring piece 37 abuts on the large-diameter part 321D of the dial 321', friction may be created between the protrusion 371 of the spring piece 37 and the large-diameter part 321D of the dial 321'. When the dial 321' is rotated and the rotation amount reaches 0.1 rounds, the protrusion 371 of the spring piece 37 engages with the recess 321F of the dial 321'. Therefore, the friction between the protrusion 371 and the dial 321' is reduced, thus reducing the rotation torque of the dial 321'.

When the dial 321' is further rotated, the engagement between the protrusion 371 and the recess 321F is released, so that the friction between the protrusion 371 and the large-diameter part 321D increases again.

When the rotation amount of the dial 321' reaches 1.1 rounds, the projection lens 3 is positioned approximately at the center in the X-axis direction. At this time, the protrusion 371 again engages with the recess 321F, accordingly the rotation torque of the dial 321' is reduced.

When the dial 321' is further rotated, the engagement between the protrusion 371 and the recess 321F will be released again.

When the rotation amount of the dial 321' reaches 2.1 rounds, the protrusion 371 again engages with the recess 321F, the rotation torque of the dial 321' is reduced.

Then, when the dial 321' is further rotated, the engagement between the protrusion 371 and the recess 321F is released. Further, when the rotation amount reaches 2.2 rounds, the projection lens 3 is positioned at the leftmost position in the movable range.

Incidentally, while the structure of the dial 321' and the movement of the projection lens 3 only in the X-axis direction are disclosed in the present exemplary embodiment, the same structure is applied to the dial that moves the projection lens 3 in the Y-axis direction, and the projection lens 3 moves from the uppermost position (lowermost position) to the lowermost position (uppermost position) by the dial being rotated for 2.2 rounds in the same manner as the dial 321'.

(6) Advantages of the Exemplary Embodiment

According to the above present exemplary embodiment, following advantages can be obtained in addition to those approximately the same as (5-1) to (5-4) and (5-6) to (5-21) in the first exemplary embodiment.

(6-1) Since the protrusion 371 of the spring piece 37 abuts on the shaft 321C' of the dial 321', the change of the friction when the protrusion 371 engages with the recess 321F is likely to transmitted to the dial body 321A of the dial 321'. Therefore, the user can securely recognize the change of the rotation torque.

(6-2) The change of the rotation torque is created not only approximately at the center in the moving direction of the projection lens 3, but also around the end in the moving direction, so that the user can easily recognize the position of the projection lens 3.

Incidentally, the scope of the present invention is not restricted to the above-described exemplary embodiments, but includes modifications and improvements as long as an object of the present invention can be addressed or achieved.

For example, while the change of the rotation torque of the dials 311 and 321 are created when the projection lens 3 is positioned approximately at the center in the moving direction of the projection lens 3, it may be available that the rotation torque is created on the dial or a part around the end in the moving direction in the same manner as the second exemplary embodiment.

Or, in the respective exemplary embodiments, it is also available that the change of the rotation torque is created per predetermined distance. Accordingly, the position of the projection lens 3 can securely be recognized by the user.

In the respective exemplary embodiments, while the protrusions 361 and 371 are formed at the spring pieces 36 and 37, and the protrusions 361 and 371 are biased toward the Y-slider 314, a ball etc. can be applied as the protrusion to be biased toward the Y-slider 314 instead.

In the respective exemplary embodiments, the protrusions 314C, 324C and 321F are respectively formed at the sliders 314 and 324, and also at the shaft 321C' of the dial 321' while the protrusions 361 and 371 are formed at the spring pieces 36 and 37, it is not limited thereto. The protrusions can be formed at the slider and at the shaft of the dial while the recesses are formed at the spring pieces.

In the respective exemplary embodiments, the Y-table 34 is placed on the base 33 while the X-table 35 is placed on the table 34, it is not limited thereto. The X-table may be placed on the base 33 with the Y-table arranged on the X-table.

In the respective exemplary embodiments, although the first light shield 11 and the second light shield 12 have the fixing plates 113 and 123, the fixing plate may not be provided. Accordingly, the number of the components can be reduced.

In the respective exemplary embodiments, while the deformable parts 112A1 and 122A1 of the first light shield 11 and the second light shield 12 are formed thinner than the attachments 112A3, 112A2, 122A3 and 122A2, the deformable part can have approximately the same thickness as the attachments 112A3, 112A2, 122A3 and 122A2.

In the respective exemplary embodiments, the second light shield 12 is attached on the periphery of the projection lens 3, however, the second light shield 12 may not be provided. For example, the projection lens position adjuster may not have the second light shield 12 when the gap is not generated between itself and the projection lens, or when the first light shield 11 is enough to shield the light without the second light shield 12. Accordingly, the number of the components and the cost of the projector 1 can be reduced.

In the respective exemplary embodiments, though a projector using three optical modulators are taken as an example in the above exemplary embodiment, exemplary embodiments of the present invention may be applied to a projector using a single optical modulator, two optical modulators or more than three optical modulators.

In the respective exemplary embodiments, though the example in which the present invention is applied to the transmission type projector is described, the present invention may be applied to a reflection type projector. Note that, the "transmission type" indicates a type in which an optical modulator such as a liquid crystal panel transmits a light, whereas the "reflection type" indicates a type in which an optical modulator reflects a light. Besides, such an optical modulator is not limited to a liquid crystal panel, and may be the one using a micro mirror. Incidentally, while the configuration of an optical system between a light source and a projection optical system may vary according to the kind of an optical modulator as well as a light source, the present invention can be applied to any type of projector equipped with a projection optical system.

What is claimed is:

1. A projector, comprising:
   a light source;
   an optical modulator that forms an optical image by modulating a light beam irradiated by the light source in accordance with image information;
   a device body having a projection optical system that projects the optical image formed by the optical modulator in an enlarged manner; and
   a casing in which the device body is housed,
   the projection optical system being provided with a projection optical system position adjuster that adjusts a position of a projection area,
   the casing having an opening through which the projection optical system is exposed and moved by the projection optical system position adjuster,
   a light shield for closing a gap between the projection optical system and the opening being disposed inside the casing, and
   the light shield including a ring held at a periphery of the projection optical system in a loosely fitted manner, and a member disposed to extend between the ring and a peripheral edge of the opening of the casing.

2. The projector according to claim 1, the projection optical system position adjuster having a base having a hole through which the projection optical system is inserted and moved, and a second light shield including an elastic member disposed to extend between the periphery of the projection optical system and a peripheral edge of a hole of the base.

3. The projector according to claim 1,
   the member including a deformable part disposed between the ring and the peripheral edge of the opening of the casing, or between the periphery of the projection optical system and the peripheral edge of a hole of the base, and attachments provided on both ends of the deformable part to be attached to the ring and the peripheral edge of the opening of the casing, or to be attached to the periphery of the projection optical system and the peripheral edge of the hole of the base, and
   the deformable part being formed thinner than the attachment.

4. The projector according to claim 1,
   the light shield including a fixing plate for fixing the member at the peripheral edge of the opening of the casing, and
   the member being sandwiched between the fixing plate and the peripheral edge of the opening of the casing.

5. The projector according to claim 1, further comprising:
   a projection optical system position adjuster that moves the projection optical system on a plane orthogonal to a light-projecting direction and adjusts a position of a projection area,
   the projection optical system position adjuster having a dial exposed from the casing when the dial is housed in the casing, a position of the projection optical system being adjusted according to a rotation of the dial, and a rotary direction of the dial at the part exposed from the casing being approximately consistent with a direction to which the projection optical system is moved.

6. The projector according to claim 5, the projection optical system position adjuster having a base fixed on the casing and provided with a hole where the projection optical system is moved; a mount slidably provided on the base with the projection optical system attached thereto; and a transmitter that transmits a rotation of the dial to the mount to linearly drive the mount.

7. The projector according to claim 6, the transmitter having a slider fixed on the mount to slide together with the mount, and a gear that rotates along with the rotation of the dial and meshes with the slider.

8. The projector according to claim 5, the projection optical system position adjuster including a recognizer to recognize a reference position of the projection optical system, and the recognizer changing a rotation torque of the dial.

9. The projector according to claim 8, the projection optical system position adjuster having a base fixed on the casing and provided with a hole where the projection optical system is moved; a mount slidably provided on the base with the projection optical system attached thereto; and a transmitter that transmits a rotation of the dial to the mount to linearly drive the mount, the recognizer having the transmitter having a recess or a protrusion, and a biasing member having a protrusion or a recess and abutting on the transmitter by being biased toward the transmitter, and the rotation torque of the dial being changed when a recess engages with a protrusion.

10. The projector according to claim 8, the projection optical system position adjuster having a base fixed on the casing and provided with a hole where the projection optical system is moved; and a mount slidably provided on the base with the projection optical system attached thereto, the dial including a dial body exposed from the casing and a shaft provided at the dial and fixed on the base, the recognizer having the shaft having a recess or a protrusion, and a biasing member having a protrusion or a recess and abutting on the shaft by being biased toward the shaft, and the rotation torque of the dial being changed when a recess engages with a protrusion.

11. The projector according to claim 8, the reference position of the projection optical system being approximately at a mid position in the moving direction of the projection optical system.

* * * * *